United States Patent
Tabata et al.

(10) Patent No.: US 6,177,952 B1
(45) Date of Patent: *Jan. 23, 2001

(54) IMAGING APPARATUS, IMAGE DISPLAY APPARATUS AND IMAGE RECORDING AND/OR REPRODUCING APPARATUS

(75) Inventors: Seiichiro Tabata, Hino; Naoto Shimada, Hachioji; Satoshi Imai, Hanno; Toshiro Okamura, Hino; Takayoshi Togino, Koganei; Yoichi Iba, Hachioji, all of (JP)

(73) Assignee: Olympic Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/996,274

(22) Filed: Dec. 22, 1997

Related U.S. Application Data

(62) Division of application No. 08/305,596, filed on Sep. 14, 1994, now abandoned.

(30) Foreign Application Priority Data

Sep. 17, 1993 (JP) .................................................... 5-231417
Sep. 21, 1993 (JP) .................................................... 5-234859
Oct. 13, 1993 (JP) .................................................... 5-255805

(51) Int. Cl.[7] .................................................... H04N 13/02
(52) U.S. Cl. .................................................... 348/47; 348/53
(58) Field of Search .................................................... 348/42, 43, 46–59; 345/5; 353/7; 359/462–466; H04N 13/02

(56) References Cited

U.S. PATENT DOCUMENTS

| | | | |
|---|---|---|---|
| 4,562,463 | * 12/1985 | Lipton | 348/42 |
| 4,706,117 | 11/1987 | Schoolman . | |
| 4,819,064 | * 4/1989 | Diner | 348/42 |
| 4,851,901 | * 7/1989 | Iwasaki | 348/42 |
| 4,881,122 | * 11/1989 | Murakami | 348/47 |
| 4,933,755 | * 6/1990 | Dahl et al. | 348/53 |
| 5,034,809 | 7/1991 | Katoh . | |
| 5,123,726 | * 6/1992 | Webster | 351/201 |
| 5,142,357 | * 8/1992 | Lipton et al. | 348/48 |
| 5,142,642 | * 8/1992 | Sudo | 348/47 |
| 5,153,569 | * 10/1992 | Kawamura et al. | 345/5 |
| 5,175,616 | * 12/1992 | Milgram et al. | 348/47 |
| 5,392,158 | * 2/1995 | Tosaki | 348/42 |
| 5,737,012 | * 4/1998 | Tabata et al. | 348/43 |
| 5,790,184 | * 8/1998 | Sato et al. | 348/53 |

FOREIGN PATENT DOCUMENTS

| | | |
|---|---|---|
| 2276395A | 11/1990 | (JP) . |
| 2281891A | 11/1990 | (JP) . |
| 495490A | 3/1992 | (JP) . |
| 439836B2 | 6/1992 | (JP) . |
| 53199B2 | 1/1993 | (JP) . |

OTHER PUBLICATIONS

Howlett, "Wide Angle Orthostereo", SPIE Vo. 1256 Steoroscopic Displays and Applications, pp. 210–223, 1990.

Kusaka, "The Fundamentals of Three Dimensional Information", Magazine of Television Society, vol. 41, No. 7, 1987, pp. 604–609.

* cited by examiner

Primary Examiner—Richard Lee
(74) Attorney, Agent, or Firm—Stevens, Davis, Miller, & Mosher, L.L.P.

(57) ABSTRACT

A stereoscopic image display apparatus having right and left display elements for displaying inputted stereoscopic image signals, right and left displaying optical systems for leading images displayed on the right and left image elements, a setting information element for outputting setting information signals on stereoscopic image display, based on the stereoscopic vision information signals about the inputted imaging distance in synchronization with the stereoscopic image signals, and a control element for controlling image position displayed on the right and left image display elements to at least optical axes of the right and left display optical systems, based on the setting information signals.

9 Claims, 34 Drawing Sheets

FIG_1

FIG_7A
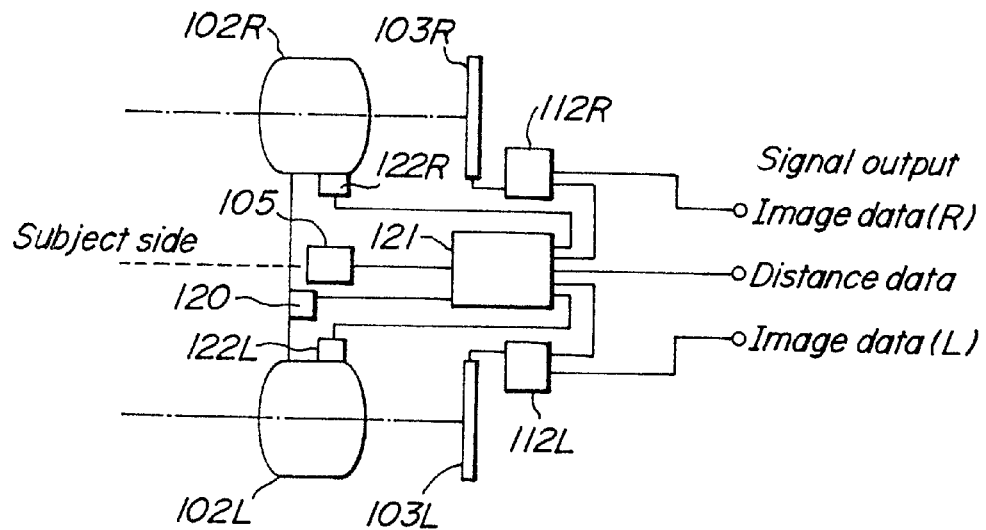
FIG_7B
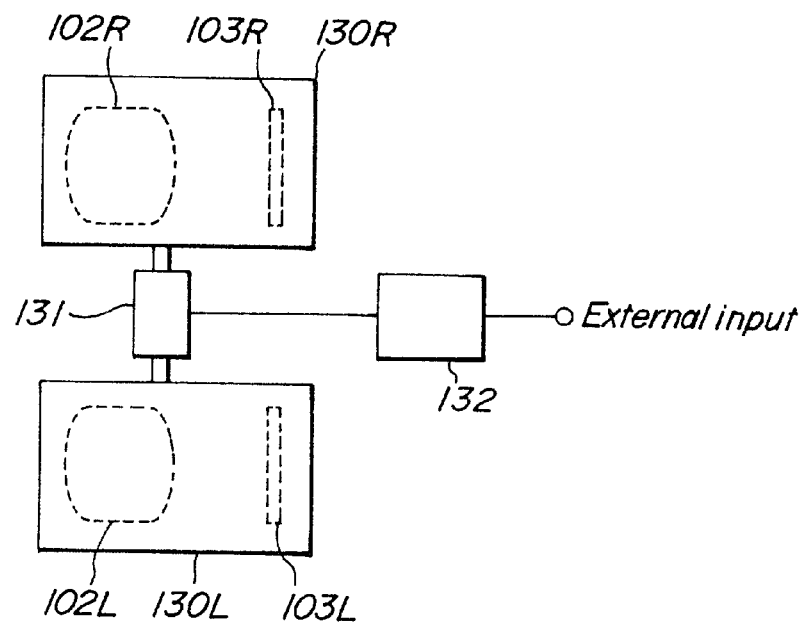

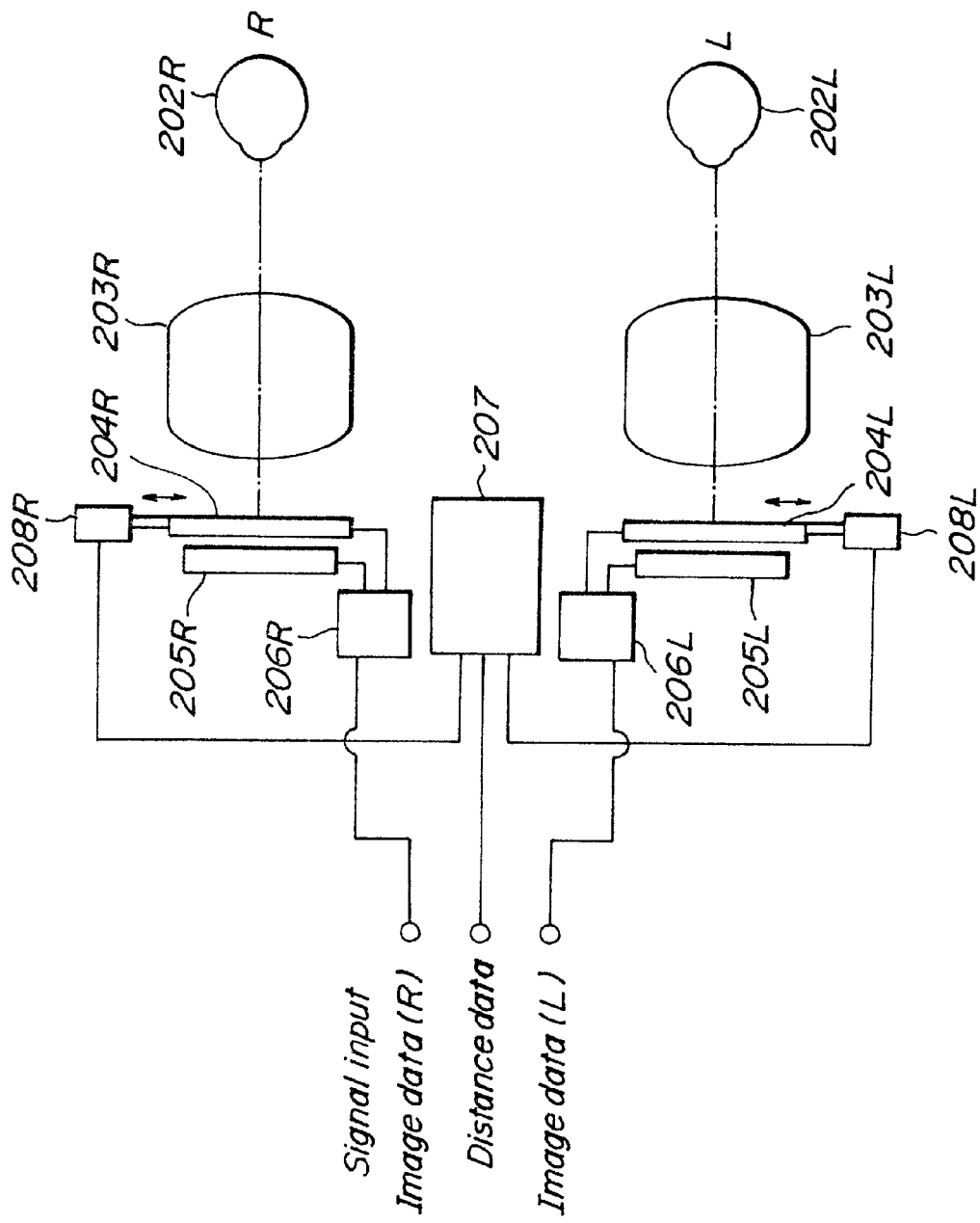

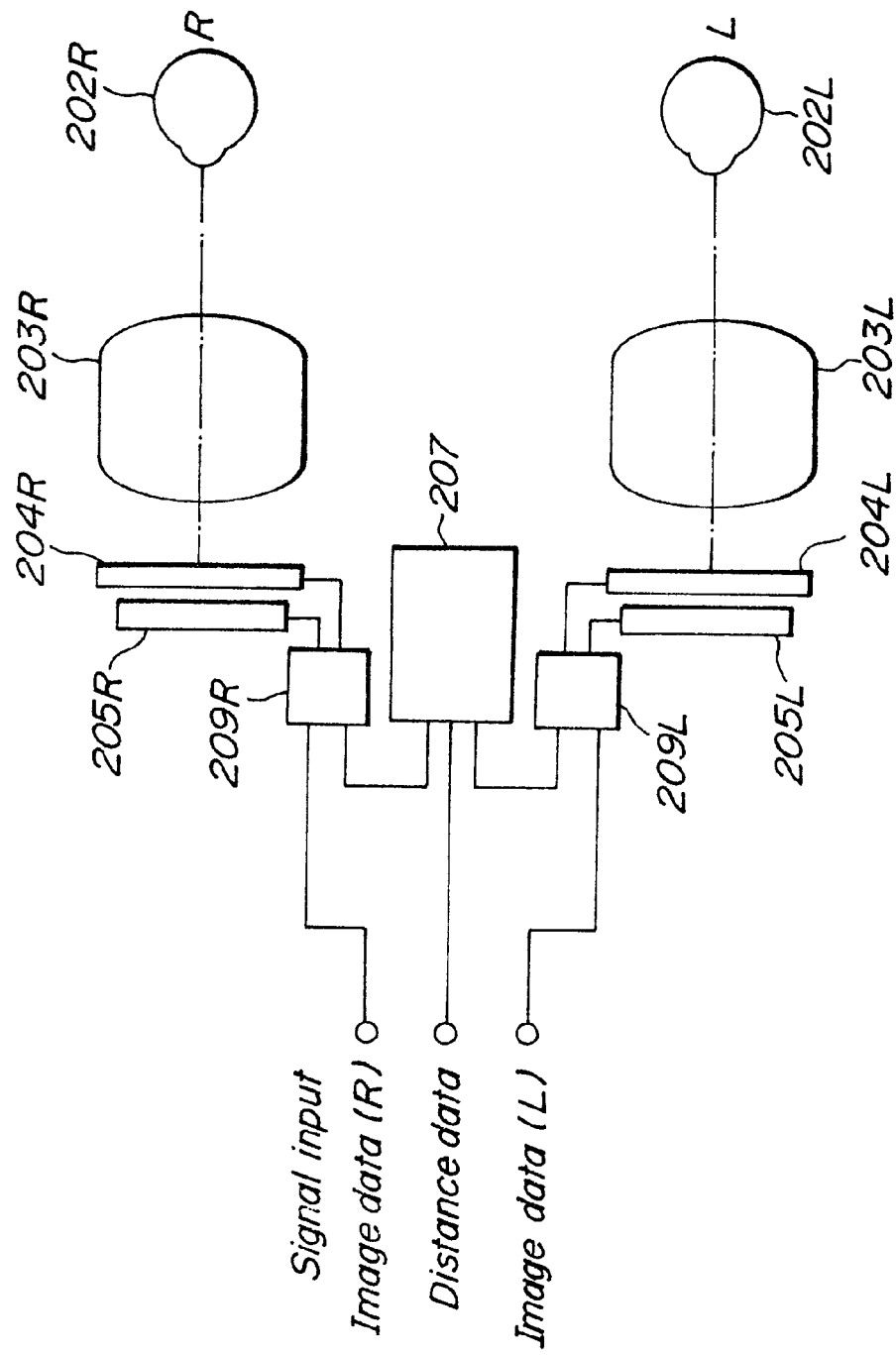

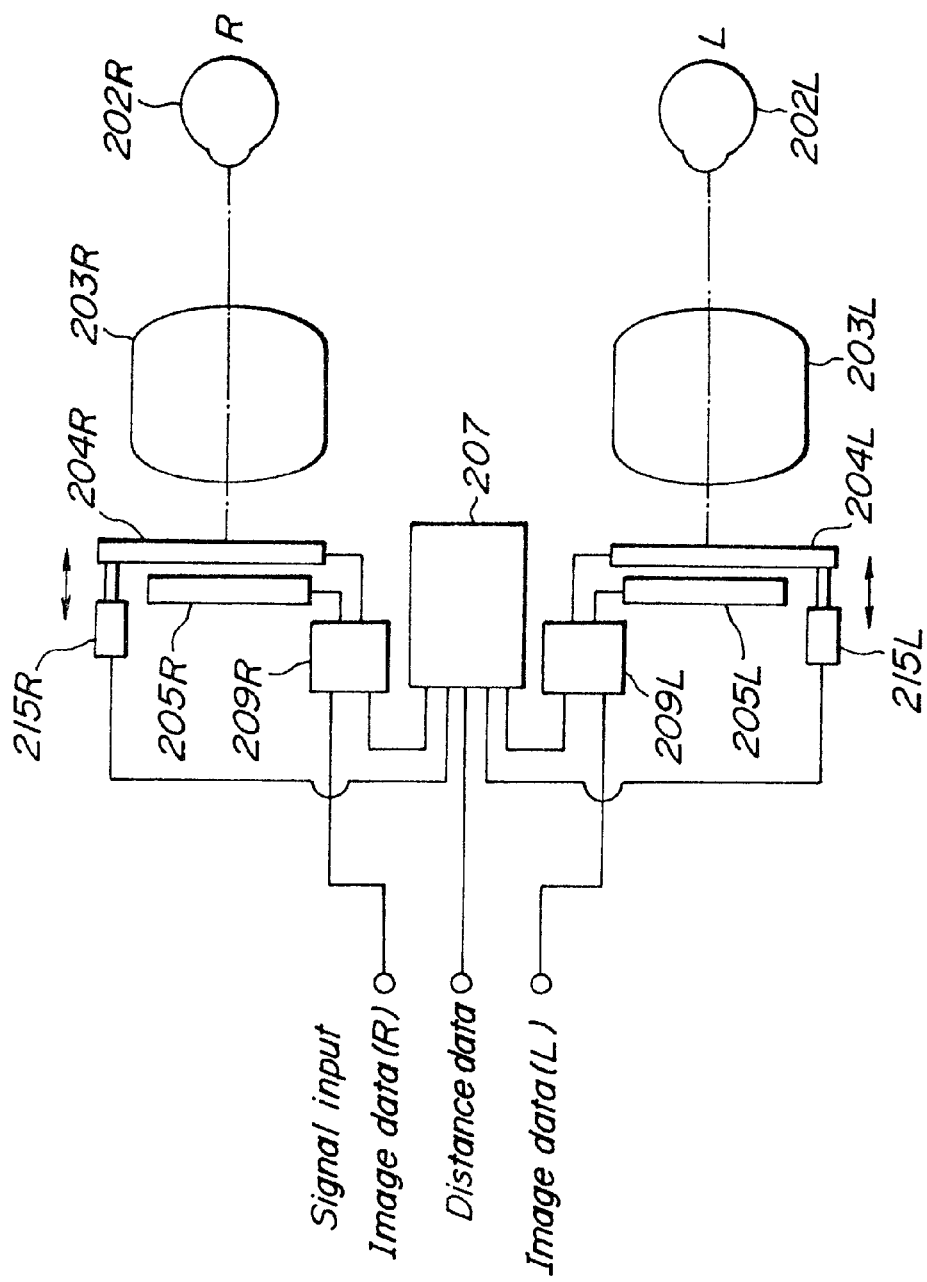

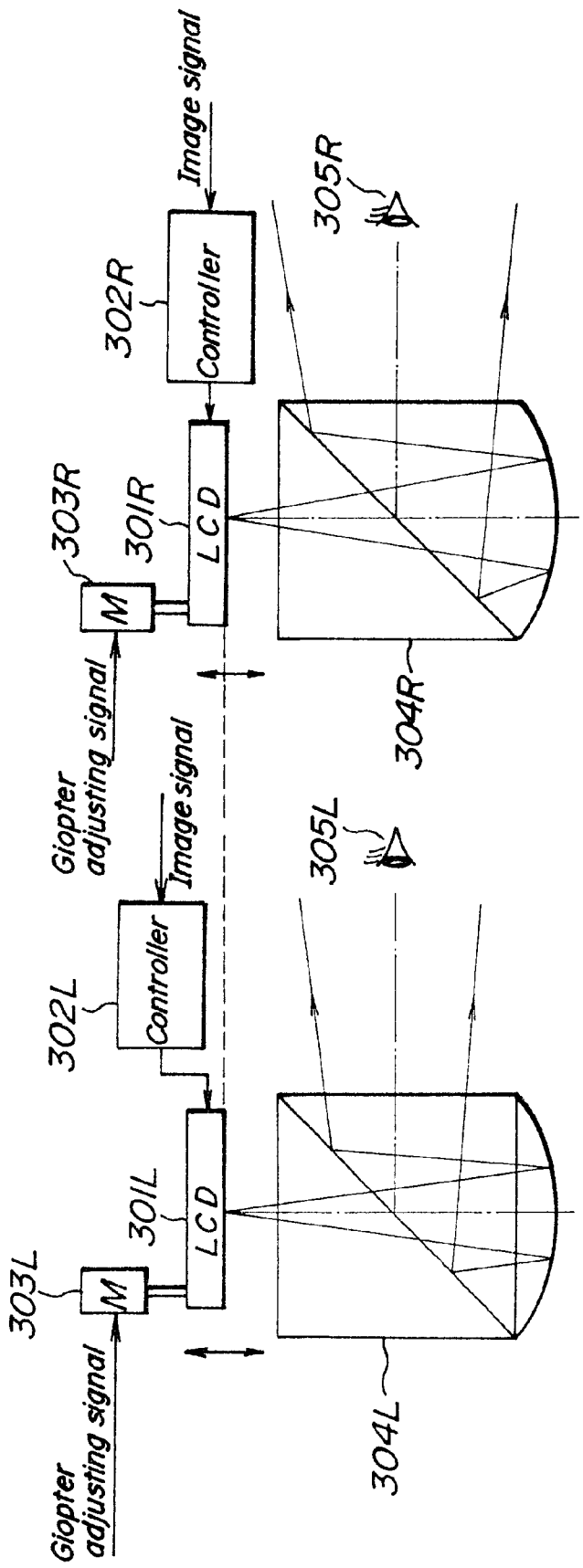

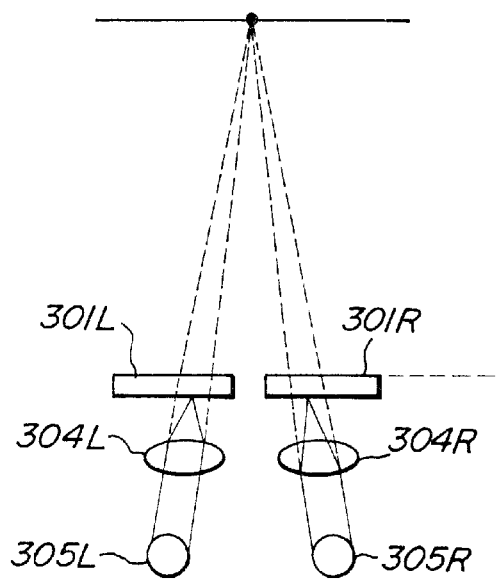
FIG_14A
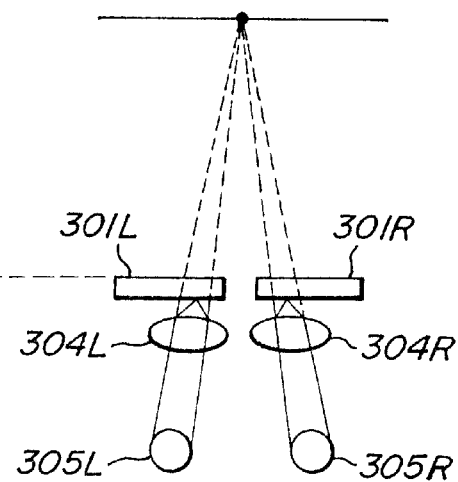
FIG_14B

FIG_15A
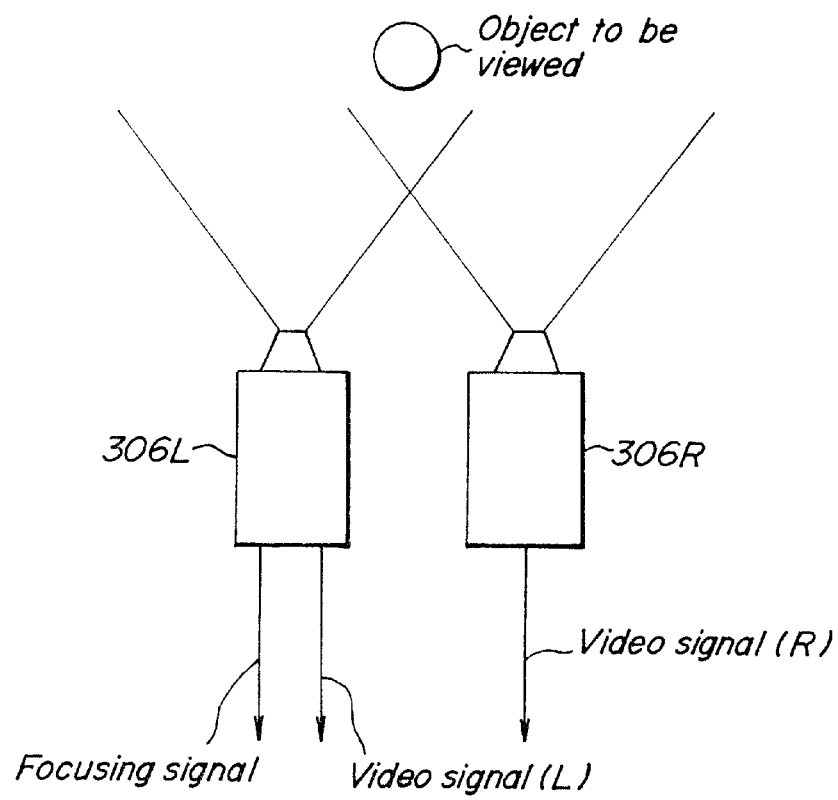
FIG_15B
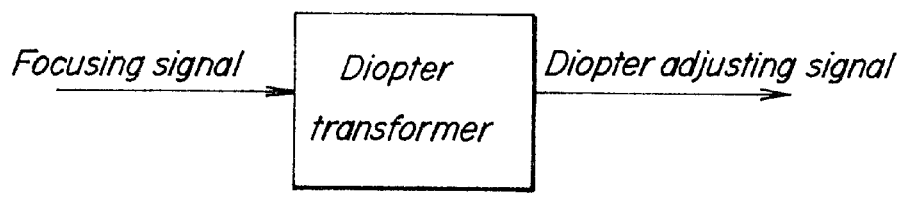

FIG_23

FIG_28

(Long distance)

(Short distance)

(Long distance)

(Short distance)

(Short distance, Large vergence angle)

(Long distance, small vergence angle)

IMAGING APPARATUS, IMAGE DISPLAY APPARATUS AND IMAGE RECORDING AND/OR REPRODUCING APPARATUS

This application is a division of Ser. No. 08/306,596 filing date Sep. 14, 1994 now abandoned.

BACKGROUND OF THE INVENTION

1. Field of the Invention

The present invention relates to an apparatus for imaging a stereoscopic image, and an apparatus for displaying the stereoscopic image, more particularly, a head-mounted apparatus for displaying a stereoscopic image capable of viewing a stereoscopic image by leading different images on right and left eyes of a viewer.

The present invention also relates to a stereoscopic image recording and/or reproducing apparatus.

2. Related Art Statement

It is well known that a reception of stereoscopic information in binocular stereoscopic vision is dominant by means of binocular parallax. (See, For example, "Magazine of Television Society, Vol. 41, No. 7, PP. 604~609, 1987"). The stereoscopic feeling obtained by the binocular stereoscopic vision has an effect when an object is present in a distance of about 1 m~100 m, but the stereoscopic feeling obtained by a vergence angle has an effect when the object is present in a distance of 1 m~10 m.

Hitherto, as a most simple method of imaging an object stereoscopically, a method of simultaneously imaging an object by arranging two cameras in parallel in such a manner that a distance between optical axes of the two cameras (hereinafter, referred to as basic line length) is separated by an interpupillary distance, has been well known. In this method, in order to emphasize a stereoscopic feeling, the basic line length is often made long in case of imaging a stereoscopic image.

Japanese Patent Application Publication No. 3,199/93 discloses a stereoscopic imaging apparatus using two video cameras. In this stereoscopic imaging apparatus, provision is made of image conditioning means for making imaging conditions of two video cameras equal, and a stereoscopic effect adjusting mechanism for adjusting a crossing position of optical axes of both video cameras, the crossing position of optical axes of both video cameras is made coincident with the position of the object by operating a drive motor with the stereoscopic effect adjusting mechanism based on the focussing adjusting data of the both video cameras.

Japanese Patent Application Publication No. 39,836/92 discloses a stereoscopic imaging apparatus using two stereoscopic vision television cameras and one television camera for image processing. In this stereoscopic imaging apparatus, provision is made of a monitor for displaying images from the image processing television camera, a control device for making a target point on the monitor and an image center of the monitor coincident with, a camera parallax angle monitor for making image centers of two stereoscopic vision television cameras and its target point coincident with, a smooth adjusting mechanism for adjusting an image from the stereoscopic vision television camera on the monitor picture plane in such a manner that a horizontal length of the object including the target point becomes constant, thereby obtaining a stereoscopic vision of a working object in an automating of camera operation.

In the above conventional example, the crossing of optical axes of two cameras is performed by driving the camera itself mechanically, but Japanese Patent Application Opened No. 276,395/90 discloses as another crossing method, the feature that the optical axes of two imaging optical systems are crossed by rotating a prism of wedge type.

Also as an apparatus for displaying an image stereoscopically, a display of a system using binocular parallax has been well known. In this system using binocular parallax, there are a time division system for alternately opening and closing right and left eyes with a shatter, and a two eyes system for displaying right image and left image independently. Particularly, a head-mounted display (HMD) using a LEEP optical system as a two eye system is disclosed in SPIE Vol.1256, p. 210 (1990). In this HMD, liquid crystal display and an ocular optical system are provided in a goggle in correspondence with right and left eyes, respectively, and right and left image signals including binocular parallax are supplied to the right and left liquid crystal displays, respectively, thereby displaying an image stereoscopically.

Japanese Patent Application Opened No. 281,891/93 discloses other head-mounted stereoscopic image display apparatus, in which liquid crystal display (LCD) and magnifying lenses are provided on right and left eyes of a viewer, respectively, and a frame for supporting these LCDs and lenses is provided in such a manner that right and left images formed on the front of face of the viewer by the magnifying lenses are coincident with each other, thereby performing a stereoscopic viewing with binocular parallax.

Generally, such an image display apparatus must be constructed in such a manner that a vergence angle and a diopter are coincident with each other in order not to cause physical disorder feeling, so that the above image display apparatus is also constructed in such a manner that the vergence angle and the diopter are coincident with each other in a predetermined conditions.

As a further stereoscopic image displaying apparatus, Japanese Patent Application Opened No. 95,490/92 discloses a stereoscopic image displaying apparatus in which two dimensional figure corresponding to each of plural cross-sectional positions in three dimensional image to be displayed is generated by a CRT and a vibrating directional screen, thereby displaying three dimensional image having a depth by this vibrating directional screen.

As described above, it is important for the imaging of the stereoscopic image to adjust optical axes and imaging conditions in two cameras. However, in the stereoscopic imaging apparatus disclosed in Japanese Patent Application Publication Nos. 39,836/92 and 3,199/93, a motor is used on the outer side of a camera body in order to adjust the crossing position of optical axes of the two video cameras. Particularly, the stereoscopic imaging apparatus disclosed in Japanese Patent Application Publication No. 39,836/92 has to use image processing television camera and the monitor for displaying its image in addition to two video cameras, so that a problem that whole apparatus becomes large arises. Moreover, the adjusting speed becomes slow in comparison with the adjusting speed of focussing and smoothing of the imaging optical system.

In contrary to this, in the stereoscopic imaging apparatus described in Japanese Patent Application Opened No. 276,395/90, the crossing position of optical axes of two imaging optical systems is optically adjusted, so that adjusting of the crossing position can be performed speedily than that of former stereoscopic imaging apparatus. However, the stereoscopic feeling felt by human under natural conditions can be obtained with following three functions, i.e. binocular parallax, binocular vergence and adjusting function, interactively, but in conventional stereoscopic imaging apparatus including the above examples, only the information of binocular parallax can be obtained, so that practical stereoscopic feeling can not be fully reproduced.

Even in the above stereoscopic image display apparatus, also, the binocular parallax is only utilized, so that similar problem as in the above stereoscopic image display apparatus arise, physical disorder feeling is caused in viewing of the stereoscopic image, and fatigue feeling becomes increased during long time viewing, and thus, if physical disorder feeling becomes large fusion of stereoscopic image can not be obtained.

Moreover, the above example does not consider the following point that at the time of stereoscopic image viewing, the vergence angle is changed by the contents of image (dimension of object to be viewed in the image, distance from eyes or the like), for example, if the object placed over long distance is viewed, the vergence angle becomes small and if the object placed by short distance is viewed, the vergence becomes large, and thus the diopter is fixed so far as the vergence angle is changed in accordance with the contents of the object to be viewed, so that the vergence angle and the diopter can not be coincided with each other unconditionally, and thus physical disorder feeling due to uncoincidence of the vergence angle and the diopter can not be decreased.

Moreover, when in the above example the stereoscopic image is viewed, as shown in FIG. 34, for stereoscopic display, image signals for right eye (hereinafter, referred to as right image signal) are inputted to a liquid crystal display (LCD) 701R to display the image for right eye (hereinafter, referred to as right image) on the LCD 701R, this right image is projected onto a right eye 703R of the viewer through an ocular lens 702R. Image signals for left eye (hereinafter, referred to as left image signal) is inputted to a liquid crystal display (LCD) 701L to display the image for left eye (hereinafter, referred to as left image) having parallax to the right image on the LCD 701L, this left image is projected onto a left eye 703L of the viewer through an ocular lens 702L. In this case, when the same object is displayed on a point A and a point B on the LCD 701L and LCD 701R, respectively, the object displayed on the point A is seen as in a point D and the object displayed on the point B is seen as in a point C, and corresponding image is formed at infinite distance as shown at left eye optical system. In such a condition, a pint (diopter) of eyes is unfocused at infinite distance so long as the object is seen as in the points C and D, so that the viewer feels physical disorder feeling.

When LCDs 701R and 701L are moved to the position shown in FIG. 1 by dotted lines, the image is formed on a plane H as shown in the right optical system and the pint of eyes is unfocused for the object shown at point C, so that the above physical disorder feeling can be canceled. However, even when the object shown at the point D is seen, the pint of eyes is unfocused at the plane H, so that the physical disorder feeling can not be canceled under any conditions.

SUMMARY OF THE INVENTION

It is an object of the present invention to resolve the above described problems of the conventional stereoscopic imaging apparatus, stereoscopic image displaying apparatus and stereoscopic image recording and/or reproducing apparatus.

It is another object of the present invention to provide an apparatus for imaging a stereoscopic image in which an imaging condition at the imaging of stereoscopic image can be set simply, the apparatus can be downsized and a stable stereoscopic image can be displayed with less physical disorder feeling at viewing.

It is a further object of the present invention to provide an apparatus for displaying a stereoscopic image in which a setting at displaying of the stereoscopic image can be simplified, the apparatus can be downsized and a stable stereoscopic image can be displayed under the condition capable of fusion-imaging with less physical disorder feeling.

It is another object of the present invention to provide an apparatus for displaying a stereoscopic image without giving the viewer physical disorder feeling, by providing a diopter adjusting mechanism in which a diopter is adjusted in accordance with a parallax or a vergence angle in such a manner that the vergence angle and the diopter are coincident with each other with unconditionally.

It is a still further object of the present invention to provide an apparatus for displaying a stereoscopic image without giving the viewer physical disorder feeling, by adjusting a displaying position of an object in such a manner that the position of the object to be displayed and an in-focusing position of eyes at that time are coincident with.

It is yet another object of the present invention to provide a stereoscopic image recording and/or reproducing apparatus in which a condition setting at recording and/or reproducing time can be simplified, the apparatus can be downsized, and right and left image data and stereoscopic information signals about its image pick-up distance can be recorded and/or reproduced with synchronously.

According to a first aspect of the present invention, there is provided an apparatus for imaging stereoscopic image comprising right and left imaging optical systems for imaging an object, right and left imaging elements for transforming object images obtained by the right and left imaging optical systems into image signals, a range detecting means for detecting imaging distance up to the object, a stereoscopic vision information process means for outputting stereoscopic vision information signals based on a imaging distance information from the range detecting means, and a control means for controlling an imaging range of the object image at the right and left imaging element to be outputted as a image signal, under the condition that optical axes of the right and left imaging optical systems are fixed to each other, based on the stereoscopic vision information signal.

In an embodiment of the apparatus according to the present invention, the apparatus comprises right and left imaging optical systems for imaging an object, right and left imaging elements for transforming object images obtained by the right and left imaging optical systems into image signals, a range detecting means for detecting imaging distance up to the object, a basic line length changing means for changing a basic line length being an optical axis distance between the right and left imaging optical systems, by simultaneously moving the right imaging optical system with its imaging elements and the left imaging optical system with its imaging elements, a basic line length detection means for detecting the basic line length of the right and left imaging optical systems, a stereoscopic vision information process means for outputting stereoscopic vision information signals based on the imaging distance information from the range detecting means and the basic line length information, and a control means for controlling an imaging range of the object image at the right and left imaging element to be outputted as a image signal, based on the stereoscopic vision information signal.

According to a second aspect of the present invention, there is provided an apparatus for displaying stereoscopic image comprising right and left image display elements for displaying inputted stereoscopic image signals, right and left displaying optical systems for leading images displayed on the right and left image display elements to right and left eyes, a setting information processing means for outputting setting information signals on stereoscopic image display, based on the stereoscopic vision information signals about the inputted imaging distance in synchronized with the stereoscopic image signals, a control means for controlling image position displayed on the right and left image display elements to at least optical axes of the right and left display optical systems, based on the setting information signals.

According to a third aspect of the present invention, there is provided an apparatus for displaying a stereoscopic image comprising a first and second image display means for displaying images corresponding to right and left eyes of a viewer, means for displaying and stereoscopically viewing different images on the first and second image display means, and a diopter adjusting mechanism receiving stereoscopic vision information signals corresponding to the parallax or vergence angle caused between the image of the first image display means and the image of the second image display means, thereby adjusting diopter of the first and second image display means.

In a preferable embodiment of the apparatus according to the present invention, the apparatus further comprises a stereoscopic image generating apparatus for generating image signal of the first image display means and the image signal of the second image display means, a stereoscopic vision information generating means for generating the stereoscopic vision information signal, an image signal transmitting means for transmitting the image signal of the first image display means and the image signal of the second image display means from the stereoscopic image generating apparatus to the first image display means and the second image display means, respectively, and a stereoscopic vision information signal transmitting means for transmitting the stereoscopic vision information signal to the diopter adjusting mechanism.

In a further preferable embodiment of the apparatus according to the present invention, the stereoscopic image generating apparatus is a stereoscopic image imaging apparatus having first and second optical systems for imaging an object and an imaging element for transforming images of objects imaged by the first and second optical systems into the first and second image signals, respectively, and for outputting them, and the stereoscopic vision information generating means has an imaging distance detecting means provided on the stereoscopic image imaging apparatus and for detecting the imaging distance to the object.

In a further preferable embodiment of the apparatus according to the present invention, the stereoscopic image generating apparatus comprises an image reproducing means for reproducing the first and second image signals recorded on a recording medium, and a stereoscopic vision information signal reproducing means for reproducing the stereoscopic vision information signal recorded in synchronized with the first and second image signals.

According to a fourth aspect of the present invention, there is provided an apparatus for displaying a stereoscopic image comprising an image displaying means for the right eye for displaying an image for right eye, an image projecting means for right eye including a projecting optical system for right eye for projecting the right image onto a right eye of a viewer, an image displaying means for left eye for displaying an image for left eye having a parallax to the right image, an image projecting means for left eye including a projecting optical system for left eye for projecting the left image onto a left eye of the viewer, thereby forming a magnified projection of the images for right and left eyes on the front of the face of the viewer, characterized by comprising plural image generating means provided to the right image projecting means and the left image projecting means, respectively, for generating images having plural different depths on the front of the face of the viewer, and an image splitting means for dividing every depths images displayed on the right and left image displaying means at production of images having plural different depths.

In a further preferable embodiment of the apparatus according to the present invention, the plural image generating means comprises a plurality of image display element each having the right and left image display means, and the right and left projection optical system each having different optical path length for the plural image display elements.

In a further preferable embodiment of the apparatus according to the present invention, the plural image generating means comprises optical path length varying means for changing the optical path length with time for the respective image display elements of the right and left image displaying means.

In a further preferable embodiment of the apparatus according to the present invention, the image splitting means divides the images by receiving stereoscopic vision information signal corresponding to the parallax or vergence angle caused between the right image and the left image.

According to a fifth aspect of the present invention, there is provided a stereoscopic image recording and/or reproducing apparatus comprising a stereoscopic image recording section for recording inputted stereoscopic image signals on a recording medium and/or a stereoscopic image reproducing section for reproducing recorded stereoscopic image signals, characterized by comprising a stereoscopic vision information recording section for recording on the recording medium, the stereoscopic information signal with respect to the imaging distance inputted in synchronized with the stereoscopic image signal, and/or a stereoscopic information reproducing section for reproducing the stereoscopic information signal recorded in synchronized with the stereoscopic information signal.

In the first aspect of the present invention, the subject is imaged by right and left imaging optical systems to produce images of the subject on the corresponding right and left image elements, respectively. The imaging distance up to the subject is measured by an imaging distance detecting means, and supplied to a stereoscopic vision information processing means, thereby generating stereoscopic information signals according to the detected imaging distance information. The stereoscopic information signals are supplied to a control means to control imaging range of the subject image to be outputted as an image signal in right and left imaging elements. Finally, the image signals are outputted from the right and left imaging elements. At the same time, stereoscopic vision information signals are outputted from the stereoscopic vision information processing means in synchronized therewith.

In the second aspect of the present invention, the subject is imaged by the right and left imaging optical systems, in which the basic line lengths are made changeable by a basic line length changing means. The imaging distance up to the subject is detected by a distance detecting means, and the basic line lengths of the right and left imaging optical systems are detected by the basic line length detecting means. These detected imaging distance information and the basic line length information are supplied to the stereoscopic vision information processing means to generate stereoscopic vision information signals according to the input signals supplied thereto in accordance with the stereoscopic vision information signals. These stereoscopic vision information signals are supplied to the control means to control imaging range of the subject image to be outputted as an image signal in right and left imaging elements in accordance with the stereoscopic vision information signals. Finally, the image signals are outputted from the right and left imaging elements. At the same time, stereoscopic vision information signals are outputted from the stereoscopic vision information processing means in synchronized therewith.

In the third aspect of the present invention, the inputted stereoscopic image signals are supplied and displayed the right and left image display elements. The setting information processing means receives the stereoscopic vision information signals relating to the imaging distance inputted in synchronized with the stereoscopic image signals, and outputs the setting information signals in the stereoscopic image displaying. Such setting information signals are supplied to the control means to control the image position displayed on the right and left image display elements with respect to optical axes of the right and left display optical systems in such a manner that the display of the stereoscopic images become suitable. Finally, the images displayed on the right and left image display elements are lead to the right and left eyes of the viewer through the right and left display optical systems.

In the sixth aspect of the present invention, the inputted stereoscopic image signals are recorded on the record carrier at the stereoscopic image recording section and the stereoscopic vision information signals relating to the imaging distance inputted in synchronized with the stereoscopic image signals are recorded on the record carrier at the stereoscopic image reproducing section, and then the stereoscopic vision information signals recorded in synchronized with the stereoscopic vision reproducing section.

BRIEF DESCRIPTION OF THE DRAWINGS

FIGS. 7A and 7B are explanatory views showing third embodiment of the construction of an imaging section of the stereoscopic imaging apparatus according to the present invention;

FIG. 8 is an explanatory view showing fourth embodiment of the construction of a displaying section of a stereoscopic image displaying apparatus according to the present invention;

FIG. 9 is an explanatory view showing fifth embodiment of the construction of a displaying section of the stereoscopic image displaying apparatus according to the present invention;

FIG. 11 is an explanatory view showing sixth embodiment of the construction of a displaying section of the stereoscopic image displaying apparatus according to the present invention;

FIGS. 12A and 12B are explanatory views showing seventh embodiment of the construction of a head-mounted stereoscopic image displaying apparatus according to the present invention;

FIGS. 14A and 14B are explanatory views exhibiting conditions of diopter in case of displaying the image of an object to be viewed at long distance and in case of displaying the image of the object to be viewed at short distance;

FIGS. 15A and 15B are explanatory views showing devices for forming the diopter adjusting signals in the image display apparatus shown in FIG. 12;

DETAILED EXPLANATION OF THE PREFERRED EMBODIMENT

Figure 1:
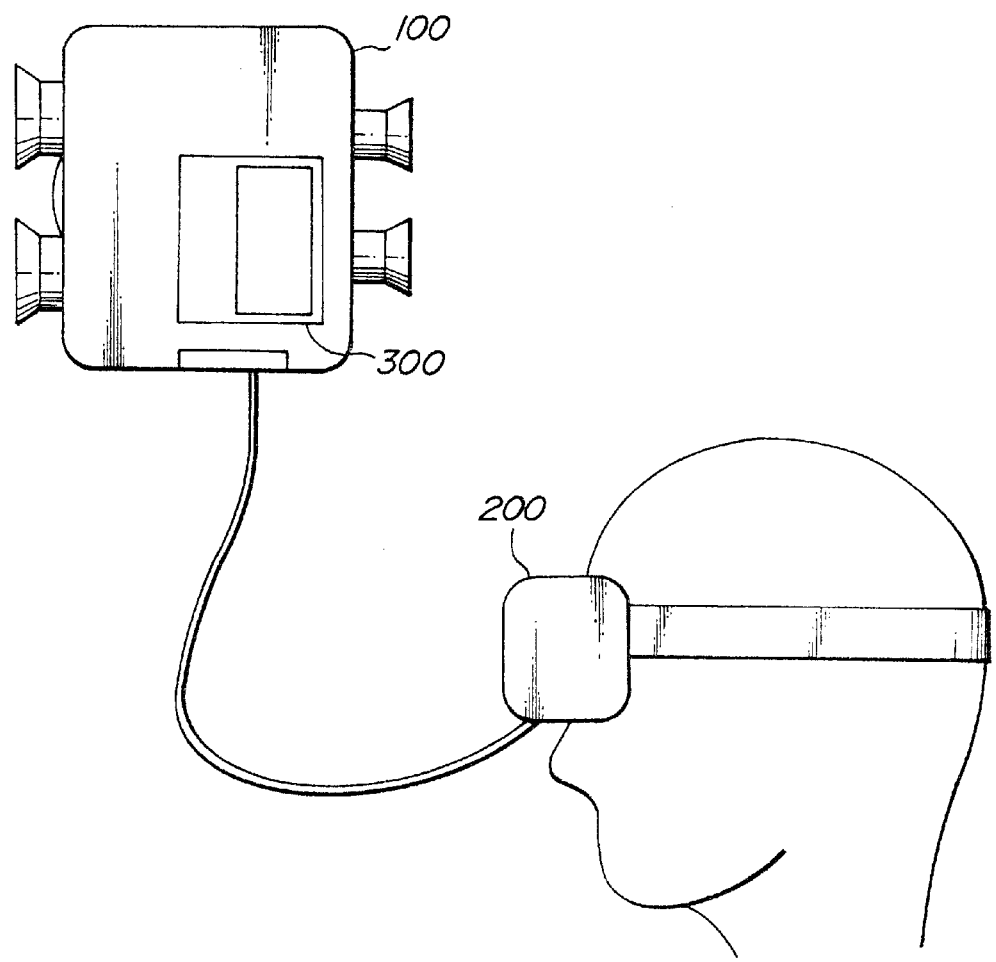
FIG. 1 is a side view showing one example of a stereoscopic image system utilizing a stereoscopic imaging apparatus, a stereoscopic image displaying apparatus and a stereoscopic image recording and reproducing apparatus according to the present invention.

The drawings show various embodiments of an apparatus for imaging a stereoscopic image according to the present invention. Like parts are shown by corresponding reference characters throughout several views of the drawings. FIG. 1 shows an embodiment of a stereoscopic image system using a stereoscopic imaging apparatus, a stereoscopic image displaying apparatus and a stereoscopic image recording and/or reproducing apparatus according to the present invention. In this embodiment, a stereoscopic camera 100 as a stereoscopic imaging apparatus is coupled to an HMD 200 as a stereoscopic image displaying apparatus through a magnetic tape device 300 as a stereoscopic image recording and/or reproducing apparatus. In this case, the magnetic tape device 300 is accommodated in the stereoscopic camera 100, but the device 300 may also be separated from the camera 100. Hereinafter, respective apparatus are explained with reference to various embodiments.

Figure 2:
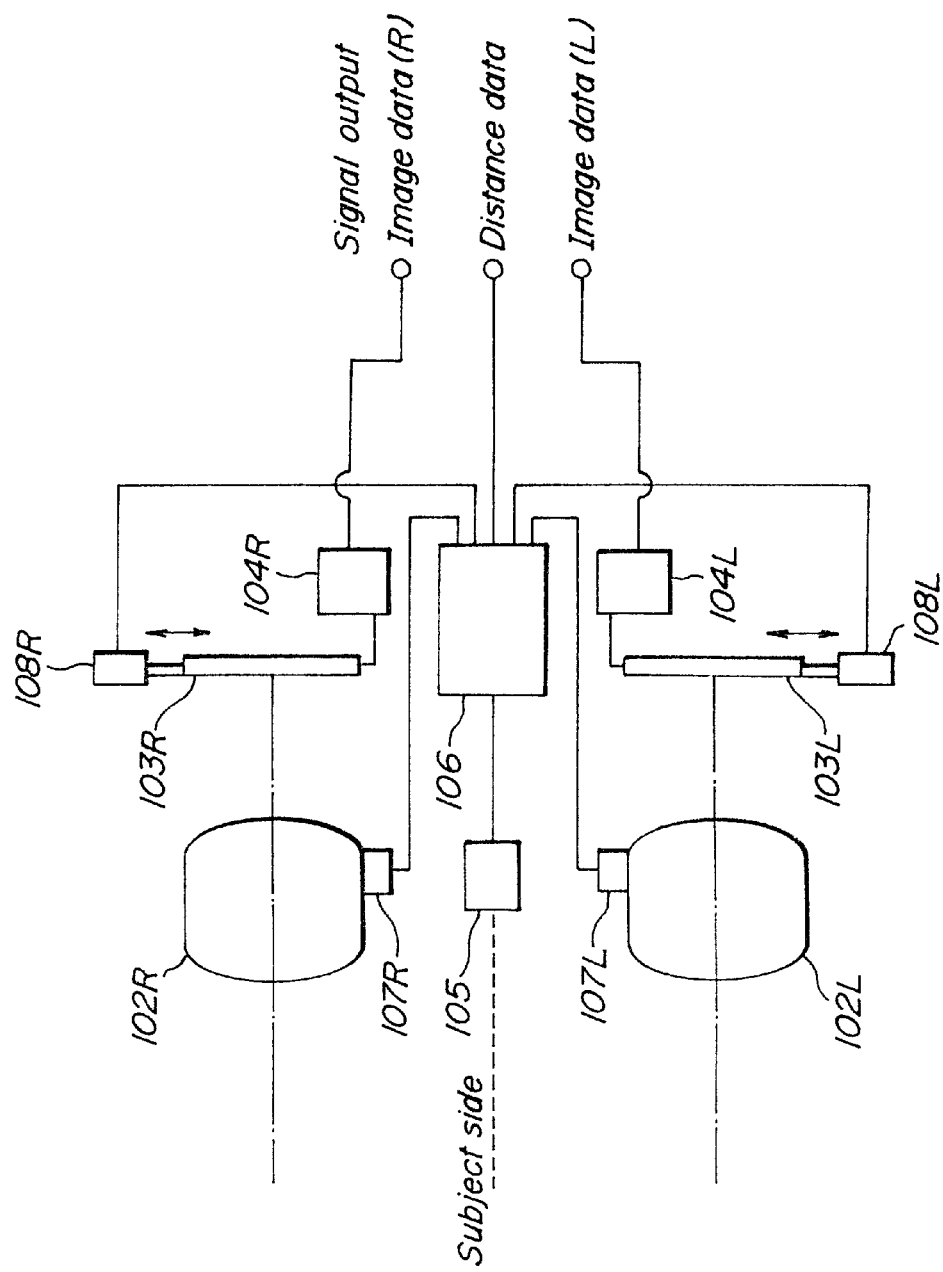
FIG. 2 is an explanatory view showing first embodiment of the construction of an imaging section of a stereoscopic imaging apparatus according to the present invention.

FIG. 2 shows an imaging section of the stereoscopic imaging apparatus as a first embodiment. In this embodiment, the apparatus is provided at a side of an object to be imaged, or viewed, with right and left imaging lens systems 102L, 102R (R is right side and L is left side) in such a manner that optical axes of these lens systems are substantially parallel, so as to focus these imaging lens systems 102L, 102R at required object positions by corresponding focus adjusting sections, respectively. Imaging elements 103L, 103R are provided behind the imaging lens systems 102L, 102R changeably in right and left direction orthogonal to optical axes of the imaging lens system corresponding to respective imaging element drive sections 108L, 108R, and outputs of these imaging elements 103L, 103R are supplied to respective imaging processing circuits 104L, 104R to obtain right video image data and left image data. A range sensor 105 is provided between imaging lens systems 102L, 102R so as to measure a distance up to the object in the direction parallel to the optical axes of the imaging lens systems 102L, 102R, and its measured distance signals are supplied to a distance data processing circuit 106 to output distance data and to control focus adjusting sections 107L, 107R and imaging element drive sections 108L and 108R.

In this case, imaging lens systems 102L and 102R are lens systems same as a fixed focus lens system adopted in television camera, video camera or still-video camera. The imaging elements 103L, 103R are semiconductor imaging elements such as CCD or the like. The range sensor 105 is a sensor of active system utilizing for example infrared ray or ultra sonic wave, or a sensor of passive system, and the imaging element drive sections 108L, 108R are for example an electric motor or an actuator such as a piezo-electric element. Required electric power is supplied to respective drive system and circuit system from power supply section of the apparatus.

Figure 3:
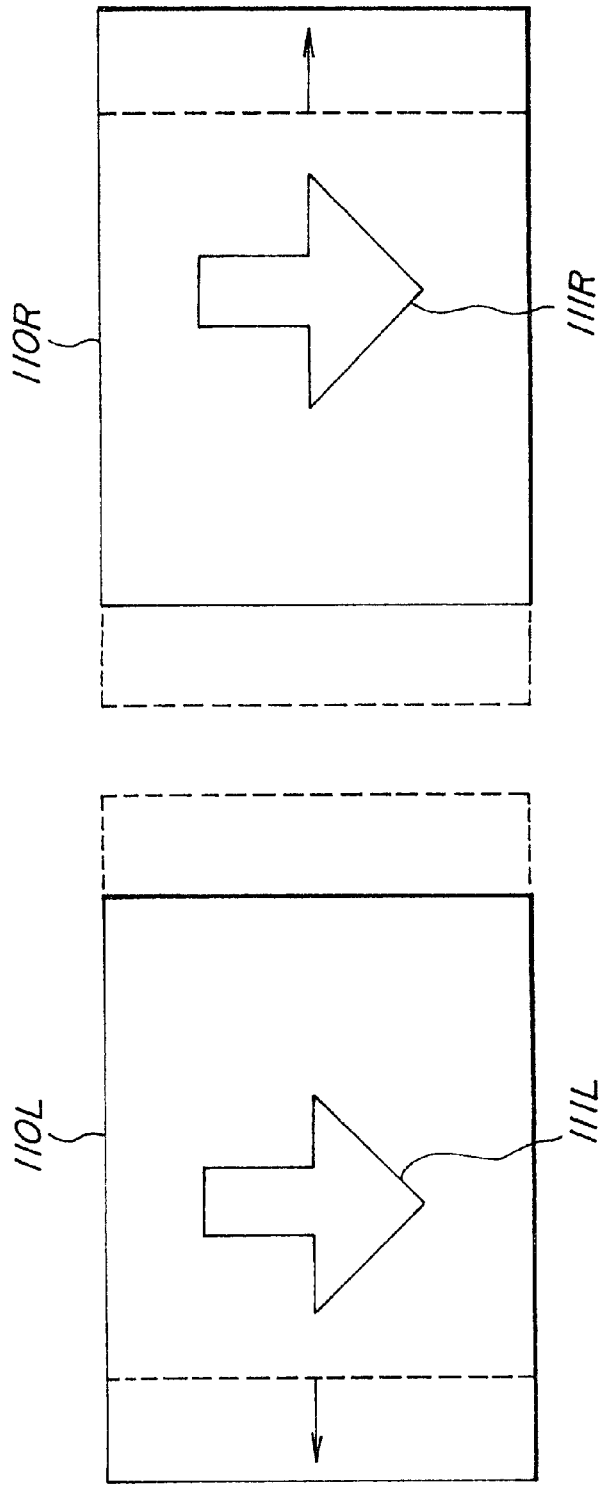
FIG. 3 is an explanatory view showing the operation of the imaging section shown in FIG. 2.

The operation of this embodiment is explained hereinafter with reference to FIG. 3. In the above construction, if the stereoscopic imaging apparatus is directed in the direction of a target subject in a whole imaging object, the subject is in near the extension lines of respective optical axes and in a range measuring direction of the range sensor 105. The range sensor 105 measures the distance up to the subject from the stereoscopic imaging apparatus and its information is outputted to a distance data processing circuit 106.

The distance data processing circuit 106 outputs stereoscopic vision information signals of three systems of a focus control signal, an image position control signal and a distance data, based on the range measuring signal. The focus control signal outputted from the distance data processing circuit 106 is supplied to the focus adjusting sections 107L, 107R to control the imaging lens systems 102L, 102R in the in-focusing conditions based on the focus control signal. The focus control signals are outputted in the form of pulse signal, voltage.current signal or the like in such a manner that imaging position of optical images 111L, 111R of the subject is present on the imaging planes 110L, 110R, based on previously programed setting information. The imaging lens systems 102L, 102R images the subject under the preferable focusing condition by the focus controlling thereby imaging the optical images 111L, 111R on the imaging planes 110L, 110R.

The image position control signal outputted from the distance data processing circuit 106 is supplied to the imaging element drive sections 108L, 108R to adjust transverse (lateral) moving condition of the imaging elements 103L, 103R. In this case, respective optical axes of the imaging lens systems 102L, 102R are set substantially parallel with each other, so that if the imaging elements 103L, 103R are made transverse (lateral) moving by the image position control signal, the position on the imaging planes 110L, 110R of the optical images 111L, 111R of the subject is moved in the direction of the basic line length. Particularly, on considering the fact that the optical images 111L, 111R become inverted image, imaging position of the subject at short distance is moved outside the basic lens length direction as compared with imaging position of the subject at long distance. In order to improve fusion condition on making stereoscopic vision, it is preferable to make the amount of peripheral information of the optical images 111L, 111R of the subject equal ratio in the basic line length. That is, in the right and left images, it is preferable to perform the imaging in such a manner that the information of scene and photographing matter around the subject is not lacked in right and left direction.

Then, in this embodiment, the image position control signal is outputted in the form of pulse signal, voltage-current signal or the like in such a manner that the imaging position of the optical images 111L, 111R of the subject is present on substantially center of the imaging planes 110L, 110R, based on previously programed setting information.

Concretely, when the subject at short distance is imaged, spacing of imaging elements 103L, 103R is made wider than that of imaging elements in case of imaging the subject at long distance. For example, providing that the basic line length is d, the imaging distance is l, a lateral width of the imaging plane 110L, 110R is a, and an imaging field angle capable of effecting the imaging by the imaging elements 103L, 103R is θ, a spacing Δ by which respective imaging elements can be widened, is shown by following equation.

$$\Delta = (a \cdot d)/(2l \cdot \theta)$$

Therefore, the imaging element drive sections 108L, 108R move respective imaging elements 103L, 103R outside by spacing Δ. In this case, the basic line length d, the lateral width a of the imaging plane 110L, 110R, and the imaging field angle θ capable of effecting the imaging by the imaging elements 103L, 103R are fixed.

Finally, in the above setting condition, the optical images 111L, 111R are converted into video signals by the imaging elements 103L, 103R, these video signals are supplied to the imaging processing circuits 104L, 104R. The imaging processing circuits 104L, 104R convert the video signals into image data signals, thereby outputting these image data signals to an external device, such as the stereoscopic image display apparatus or stereoscopic image recording and reproducing apparatus or the like. Moreover, the distance data signals outputted from the distance data processing circuit 106 are also outputted to the external device with substantially same timing as the right and left image data signals. Indeed, the synchronized processing circuit is provided before the external output section, thereby outputting the distance data signals under the condition that right and left image data signals and the distance data signals are synchronized with each other.

In order to image the stereoscopic image, in addition to the above process, brightness and hue of right and left images must be adjusted. If one control device is provided in the apparatus, and right and left imaging lens systems 102L, 192R, the imaging elements 103L, 103R, the imaging processing circuits 104L, 104R are controlled simultaneously, these adjustments can decrease shift of these brightness and hue on the right and left image data.

According to this embodiment, the imaging condition of the stereoscopic image can be set simply at the imaging, and whole stereoscopic imaging apparatus can be downsized. Moreover, as right and left image data, image data including equal information amount in the right and left directions about target subject can be obtained, and the distance information of the target object can be obtained, so that physical disorder feeling on viewing the stereoscopic image can be decreased, thereby obtaining a stable fusing.

Figure 4:
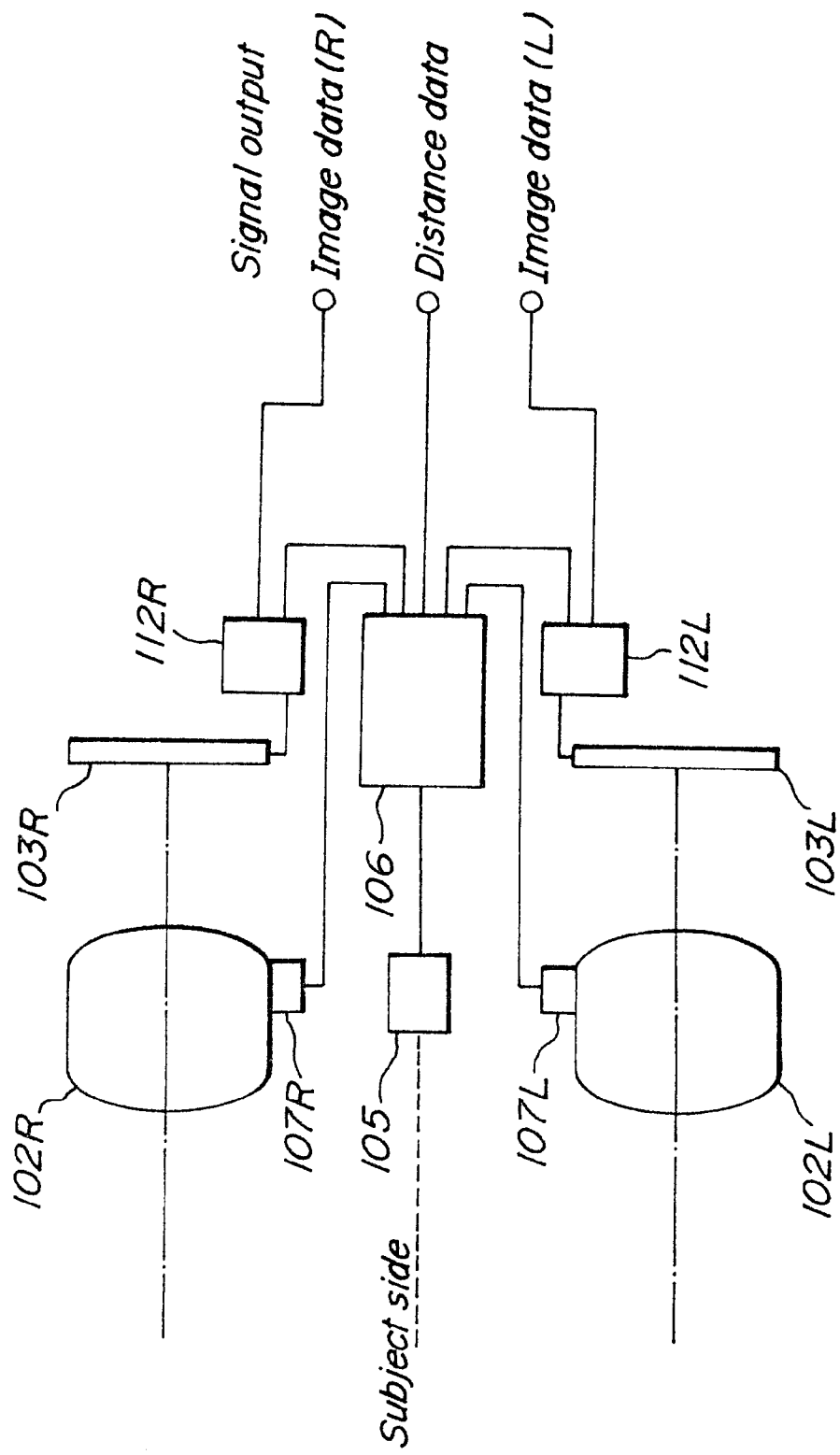
FIG. 4 is an explanatory view showing second embodiment of the construction of an imaging section of the stereoscopic imaging apparatus according to the present invention.

FIG. 4 shows an imaging section of the stereoscopic imaging apparatus as a second embodiment. In this embodiment, the imaging elements 103L, 103R having large imaging range are used instead of movement of the imaging elements 103L, 103R by the imaging elements drive sections 108L, 108R shown in the first embodiment, and the imaged signals from the imaging elements 103L, 103R are processed in imaging process circuits 112L, 112R based on imaging position control signals from the distance data processing circuit 106, thereby performing electrically the same function as the first embodiment. The other construction is the same as that of the first embodiment, so that its detailed explanation is omitted.

As the imaging elements 103L, 103R, imaging elements, in which its length is more than 1.1 times, preferably 1.3~2 times of imaging range outputted from the imaging process circuits 112L, 112R as an image data signal, are used, and the center position of these imaging planes 110L, 110R are disposed in such a manner that it is moved outside the basic rectangular shape to respective optical axes of the imaging lens systems 102L, 102R. That is, the imaging planes 110L, 110R are disposed under the off-center condition to the imaging lens systems 102L, 102R. As the imaging lens systems 102L, 102R, imaging lens systems having numerical aperture capable of covering whole imaging planes 110L, 110R of the imaging elements 103L, 103R are used.

Figure 5:
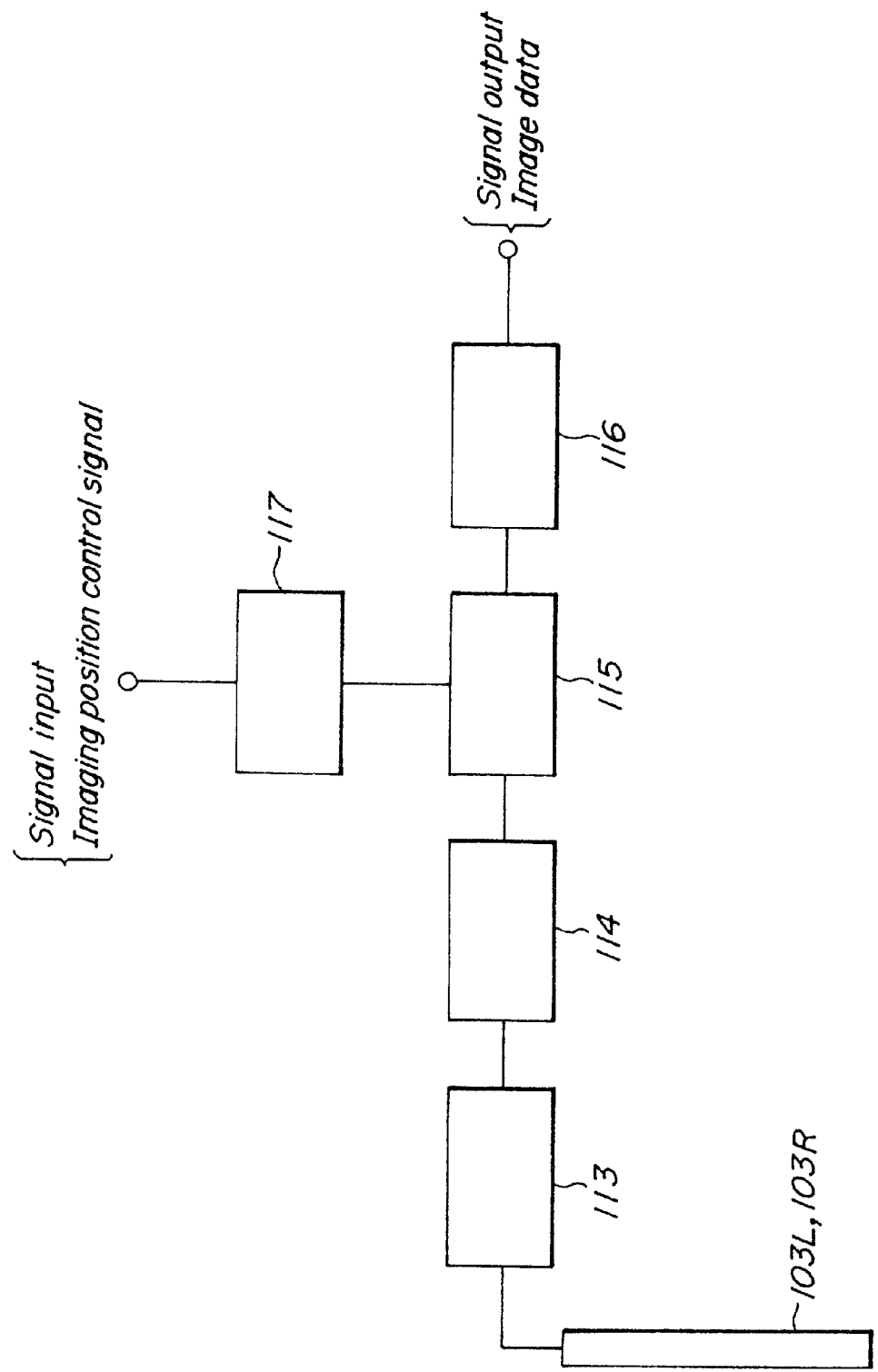
FIG. 5 is a block circuit diagram showing the construction of an image processing circuit shown in FIG. 4.

As shown in FIG. 5 by one imaging process circuits 112L, the imaging process circuits 112L, 112R comprise a preamplifier 113, an A/D converter 114, a memory 115, a D/A converter 116 and an address generator 117, imaging signals from the imaging element 103L are stored in the memory 115 through the preamplifier 113 and the A/D converter 114, the imaging data stored in the memory 115 are selected by the address generator 117 based on the imaging position control signals from the distance data processing circuit 106, and the selected image data are outputted through the D/A converter 116. The other imaging process circuits 112R is also constructed in the same manner as in the above imaging process circuits 112L. Respective drive systems and circuit systems are supplied with necessary supply power from the power supply source of the apparatus (not shown).

Figure 6:
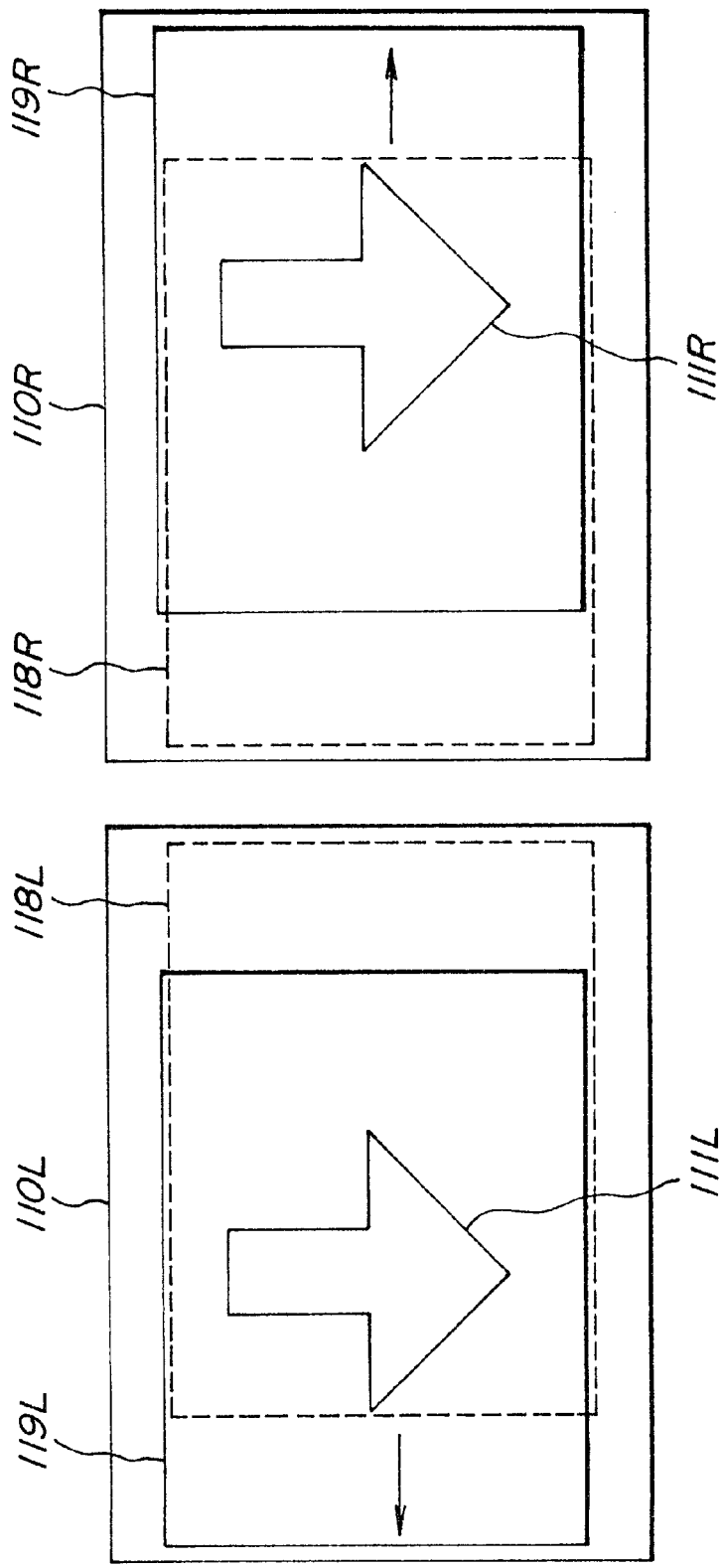
FIG. 6 is an explanatory view showing the operation of the imaging section shown in FIG. 4.

Hereinafter, the operation of the second embodiment is explained with reference to FIG. 6. In this case, the basic function is the same as that of the first embodiment, so that only its difference points are explained. The imaging position control signals outputted from the distance data processing circuit 106 are inputted to the address generator 117 of the imaging process circuits 112L, 112R. These imaging position control signals are outputted in the form of pulse signal, voltage-current signal or the like in such a manner that the imaging position of optical images 111L, 111R of the subject is positioned at substantially center of imaging range in the imaging planes 110L, 110R.

Whole imaging signals from the imaging plane 110L (or 110R) of the imaging element 103L (or 103R) are stored in the memory 115 after amplifying them in the pre-amplifier 113, and digitalizing them in the A/D converter 114. The address generator 117 receives the imaging position control signals from the distance data processing circuit 106, and generates address signals for taking out necessary imaging range from whole image portion stored in the memory 115 based on the imaging position control signals. The memory 115 receives address signals from the address generator 117 and generates only the imaging data present in the necessary imaging range. The imaging data outputted from the memory 115 are converted into analog signals in the D/A converter 116 and outputs as an image data signal. Therefore, in this embodiment, the range of imaging data outputted from the memory 115, that is, the imaging range moves between the imaging range 118L, 118R at long distance and the imaging range 119L, 119R at short distance on the imaging planes 110L, 110R according to the imaging distance of the subject.

According to this embodiment, the imaging conditions of the stereoscopic image can be set simply in the same manner as in the imaging of the first embodiment, and whole stereoscopic imaging apparatus can be downsized as compared with that of the first embodiment. At the same time, as right and left image data, image data including equivalent information amount in the direction of basic line length around the aimed subject can be obtained, and thus the smooth exhibiting condition can be ensured.

FIGS. 7A and 7B show an imaging section of the stereoscopic imaging apparatus as a third embodiment. In this embodiment, a zoom lens system is used as the imaging lens system 102L, 102R, to change these basic line length and to correct the moving amount of imaging range in accordance with the zooming condition or the change of basic line length. The other basic construction is the same as that of the second embodiment, so that its detailed explanation is omitted. In this embodiment, as shown in FIG. 7A, a basic line length detector 120 is provided between the imaging lens systems 102L, 102R, and its detected output is supplied to a stereoscopic vision data processing circuit 121. The imaging lens system 102L, 102R are provided with a lens system condition adjusting section 122L, 122R including a focus adjusting section and a zooming adjusting section, thereby adjusting the focusing condition and the zooming condition of the corresponding imaging lens systems 102L, 102R based on the lens system condition control signal from the stereoscopic vision data processing circuit 121.

In order to change the basic line length, as shown in FIG. 7B, the corresponding imaging lens systems 102L, 102R and the imaging elements 103L, 103R are held to driving frames 130L, 130R, respectively, and these driving frames 130L, 130R are connected to a basic line length driving section 131 in such a manner that these driving frames are linked and moved in parallel and in the closing and separating direction to each other, thereby changing the basic line length by controlling these driving frames 130L, 130R with signals from a basic line length control circuit 132. In FIG. 7A, moreover, the imaging processing circuits 112L, 112R receive the imaging position control signals from the stereoscopic vision data processing circuit 121, based on the range measuring signals from the range measuring sensor 105. Respective drive systems and circuit systems are also supplied with necessary supply power from the power supply source of the apparatus (not shown).

Hereinafter, the operation of the second embodiment is explained. In this case, the basic function is the same as that of the second embodiment, so that only its difference points are explained. In the imaging of stereoscopic image, there is often the cases that the scale of the subject is changed by adjusting the zooming condition and the stereoscopic effect is emphasized by adjusting the basic line length. In this case, the moving amount of imaging range must be corrected in accordance with the zooming condition and the change of basic line length. In this embodiment, therefore, the stereoscopic vision data processing circuit 121 receives range measuring signal from the range measuring sensor 105 and the basic line length signal from the basic line length detector 120, and outputs stereoscopic vision information signal, that is, signals of three systems of the lens system condition control signal, the imaging position control signal and the distance data signal.

The stereoscopic vision data processing circuit 121, moreover, receives the zooming condition signal from a zoom operation button provided to the stereoscopic imaging apparatus, and feedbacks its output to the lens system condition control signal. This lens system condition control signal outputted from the stereoscopic vision data processing circuit 121 is supplied to the lens system condition adjusting section 122L, 122R, thereby adjusting respective focusing condition and zooming condition. In this case, the lens system condition control signal is outputted in the form of pulse signal, voltage-current signal or the like, based on the pre-programed setting information.

The imaging position control signal outputted from the stereoscopic vision data processing circuit 121 is supplied to the address generator 117 of the the imaging processing circuits 112L, 112R. In this case, the imaging position control signal is outputted in the form of pulse signal, voltage-current signal or the like, in such a manner that the imaging position of the optical images 111L, 111R of the subject is placed in about center of the imaging range in the imaging planes 110L, 110R. In this case, for example, providing that the basic line length is d, the imaging distance is l, a lateral width of the imaging range of the imaging plane 110L, 110R is a, and an imaging field angle capable of effecting the imaging by the imaging elements 103L, 103R is θ, the lateral moving amount Δ of the imaging range is Δ=(a·d)/(2·l·θ). Therefore, if the change of the basic line length is reflected in the basic line length d and the zooming condition is reflected in the imaging field angle θ, the lateral moving amount Δ of the imaging range can be corrected.

In this embodiment, the above basic line length is changed in accordance with the basic line length setting signal from the external setting switch or the stereoscopic vision data processing circuit 121. In order to change the basic line length, the basic line length setting signal from the external setting switch or the stereoscopic vision data processing circuit 121 is inputted to the basic line length controlling circuit 132 shown in FIG. 7B, in accordance with this signal, basic line length control signal is supplied to the basic line length driving section 131 from the basic line length control circuit 132, thereby moving the right and left drive frames 130L, 130R in the horizontal direction orthogonal to the optical axes by the change amount of the basic line length. In this way, if the right and left drive frames 130L, 130R are moved, respective imaging lens systems 102L, 102R and imaging elements 103L, 103R are also moved integrally, so that the basic line length being a spacing between right and left optical axes can be changed.

According to this embodiment, the imaging condition of the stereoscopic image can be set simply at the imaging in the same manner as in the second embodiment and as right and left image data, image data including equal information amount in the direction of basic line length about target subject can be obtained, and thus the smooth exhibiting condition can be ensured. Therefore, physical disorder feeling on the viewing of the stereoscopic image can be decreased, thereby obtaining a stable fusing.

The change of the basic line length according to this embodiment may also be applied to the above first embodiment.

FIG. 8 shows a displaying section of the stereoscopic image display apparatus according to the present invention as a fourth embodiment. In this embodiment, the apparatus comprises display lens systems 203L, 203R disposed at the side of right and left eyes 202L, 202R, respectively, and display elements 204L, 204R disposed behind the display lens systems 203L, 203R. The display lens systems 203L, 203R are constructed by only ocular lens system or a combination of a ocular lens system and a relay lens system, in such a manner that right and left optical axes are disposed in parallel. The display elements 204L, 204R are held movably in the right and left directions orthogonal to the respective optical axes. In this case, the display elements 204L, 204R are constructed mainly by LCD, and are also made by two dimensional array of LCD or small LCD. Illuminating light sources 205L, 205R are disposed behind the display elements 204L, 204R.

The display elements 204L, 204R and the illuminating light sources 205L, 205R are connected to display processing circuits 206L, 206R, respectively. The display elements 204L, 204R are connected to display element drive sections 208L, 208R, respectively. The construction of these drive sections 208L, 208R are the same as that of the imaging element drive sections 108L, 108R shown in FIG. 2 and these drive sections are connected to a setting data processing circuit 207. Respective drive systems and circuit systems are also supplied with necessary supply power from the power supply source of the apparatus (not shown).

Hereinafter, the operation of the fourth embodiment is explained. In this case, In the above construction, the image data signals for stereoscopic vision are supplied by an external device such as, for example, the above stereoscopic imaging apparatus and a CG generating device or stereoscopic image recording and reproducing apparatus or the like. In this case, provided that right and left image data signals supplied from the external apparatus are set under the condition that an aimed exhibiting matter is exhibited at substantially same position of the right and left images. These right and left image data signals are supplied to the displaying processing circuits 206L, 206R, respectively, and supplied to the display elements 204L, 204R after converting them into display signals, thereby displaying the images on the respective display planes. During the operating periods of the displaying processing circuits 206L, 206R, the illuminating light sources 205L, 205R receive required supply power, thereby illuminating the corresponding display elements 204L, 204R.

The setting data processing circuit 207 receives the distance data signals as a stereoscopic vision information signal in synchronization with the right and left image data signals. The distance data signal includes information of the exhibiting distance for the aimed exhibiting matter selected from the whole display objects. The right and left image data signals and distance data signals are supplied to different input terminals, so that practically, the synchronizing processing circuit is provided just behind the external input section, thereby distributing the required signals on the respective processing circuits after synchronizing the right and left image data signals with the distance data signals.

The setting data processing circuit 207 converts the distance data signal into the display position control signal, and supplied to the display element drive sections 208L, 208R. In this way, the display position control signals are supplied to the display element drive sections 208L, 208R from the setting data processing circuit 207, so that even if the right and left image data signals include only the parallax information of the aimed exhibiting matter and the displaying object around thereof, the vergence information of the aimed exhibiting matter can be exhibited together with the parallax information by merging it with the display position control signal.

The display position control signal is outputted in the form of pulse signal, voltage-current signal or the like according to previously programed setting information. The display element drive sections 208L, 208R move the display elements 204L, 204R inside in the right and left directions, so as to make a vergence angle depending to the exhibiting distance by the display position control signal as a basis of feature that the aimed exhibiting matter is displayed at the substantially same position on the surface thereof. Concretely, when the exhibiting matter at short distance is displayed, the spacing of the display elements 204L, 204R can be shortened as compared with the case of displaying the exhibiting matter at long distance. In this case, providing that for example, the interpupillary distance length is d', the exhibiting distance is l', a lateral width of the display range of display element 204L, 204R is a', and an display angle capable of effecting the displaying by the display elements 204L, 204R is θ', a narrow spacing Δ' capable of displaying by the display elements 204L, 204R can be displayed as follows.

$$\Delta' = (a' \cdot d')/(2l' \cdot \theta')$$

Therefore, the image displayed on the display elements 204L, 204R are lead on the eyes 202L, 202R through the display lens systems 203L, 203R, respectively, under the condition including the parallax information and the vergence information. In order to display the stereoscopic image, in addition to the above process, the brightness and the hue of right and left images must be adjusted, these adjustments are performed in such a manner that one control device is provided in the apparatus to simultaneously control the right and left display lens systems 203L, 203R, display elements 204L, 204R and display processing circuits 206L, 206R, thereby performing the adjusting in such a manner that the shift of the above brightness and the hue become decreased.

According to this embodiment, the setting condition on displaying the stereoscopic image can be made simply and whole stereoscopic image display apparatus can be downsized. The image viewed by a viewer includes the vergence information in accordance with the exhibiting distance of the aimed exhibiting matter in addition to the parallax information, so that the stereoscopic image can be viewed with less physical disorder feeling and with the stable fusing condition.

Moreover, in this embodiment, the vergence information is exhibited by laterally moving the display elements 204L, 204R by the display position control signals from the setting data processing circuit 207, but the vergence information can also be exhibited by making eccentric (tilting or shifting) the display lens system 203L, 203R instead of lateral movement of the display elements 204L, 204R, thereby obtaining the same effect.

FIG. 9 shows a displaying section of the stereoscopic image display apparatus according to the present invention as a fifth embodiment. In this embodiment, the displaying elements 204L, 204R having large displaying range by the inputted image data signal are used instead of movement of the display elements 204L, 204R by the display elements drive sections 208L, 208R shown in the fourth embodiment, and the inputted image data signals are processed in displaying process circuits 209L, 209R in accordance with display position control signals from the setting data processing circuit 207, thereby performing electrically the same function as the fourth embodiment. The other construction is the same as that of the fourth embodiment, so that its detailed explanation is omitted.

As the display elements 204L, 204R, display elements, in which its length in the basic line length direction is more than 1.1 times, preferably 1.3~2 times of displaying range of the image data signal from the displaying process circuits 209L, 209R are used, and the center position of these displaying planes are disposed in such a manner that it is moved inside in the right and left direction with respect to respective optical axes of the displaying lens systems 203L, 203R. That is, the displaying planes are disposed under the off-center condition to the displaying lens systems 203L, 203R. As the displaying lens systems 203L, 203R, displaying lens systems having the magnitude capable of covering whole displaying planes of the displaying elements 204L, 204R are used.

Figure 10:
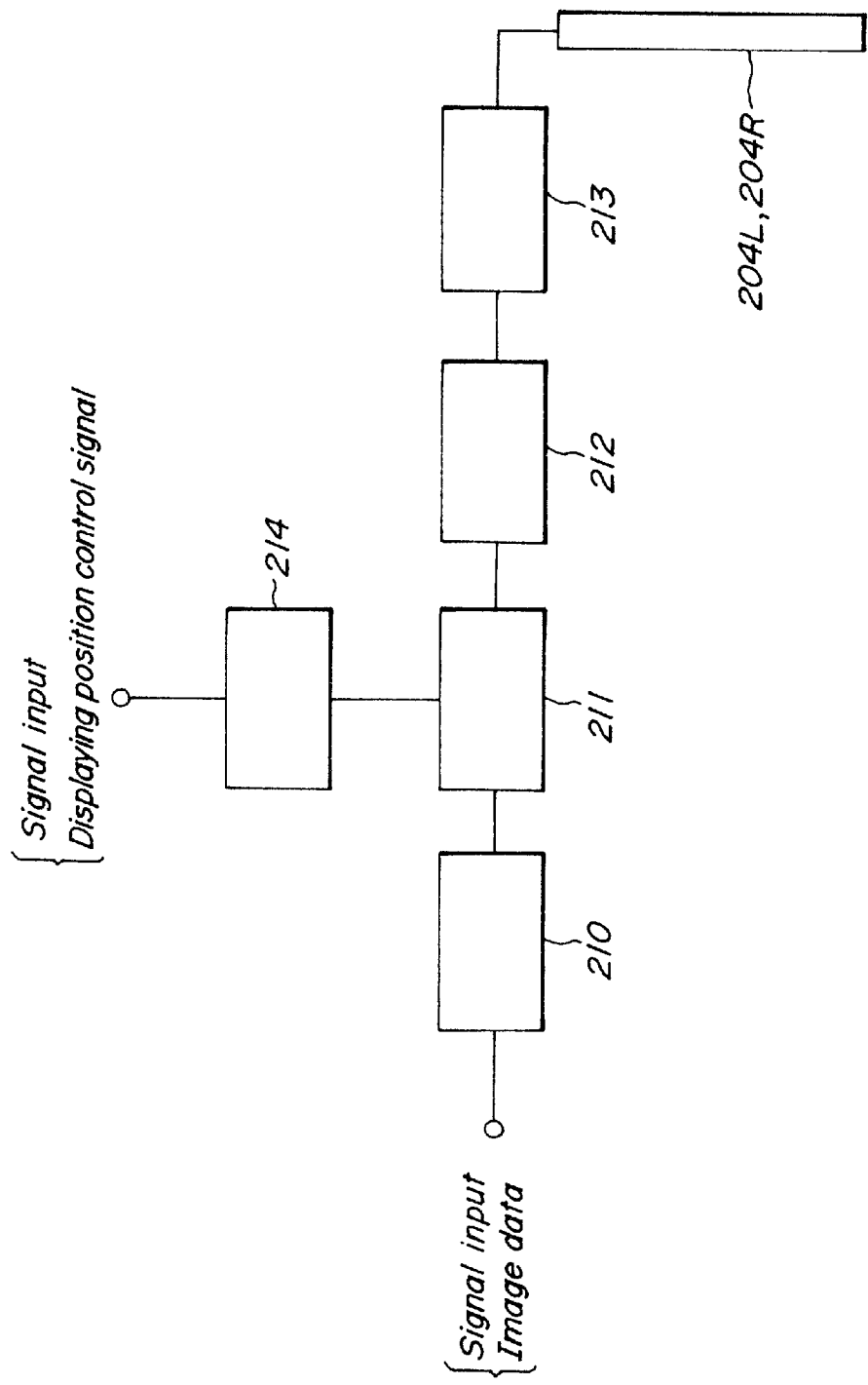
FIG. 10 is a block circuit diagram showing the construction of an image display processing circuit shown in FIG. 9.

As shown in FIG. 10 by one displaying process circuit 209L, the displaying process circuits 209L, 209R comprise an A/D converter 210, a memory 211, a D/A converter 212, a drive circuit 213 and an address generator 214, inputted image data signals are stored in the memory 211 through the A/D converter 210, the required displaying range of the imaging data stored in the memory 211 are set by the address generator 214 in accordance with the display position control signals from the setting data processing circuit 207, and the set image data are supplied to the drive circuit 213 through the D/A converter 212, thereby displaying the display element 204L. The other displaying process circuit 209R is also constructed in the same manner as in the above displaying process circuits 209L. Respective circuit systems are supplied with necessary supply power from the power supply source of the apparatus (not shown).

Hereinafter, the operation of the fifth embodiment is explained. In this case, the basic function is the same as that of the fourth embodiment, so that only its difference points are explained. In this embodiment, the effective display plane in the display elements 204L, 204R is larger than the display range of the image data signal, and respective optical axes of the display lens systems 203L, 203R are set in substantially parallel, so that an incident angle of the light flux incident on the eyes 202L, 202R can be changed by moving the display range of the image in the display plane in the right and left directions. To this end, in this embodiment, the displaying position control signals outputted from the distance data processing circuit 106 are inputted to the address generator 214 of the displaying process circuits 209L, 209R. These displaying position control signals are outputted in the form of pulse signal, voltage-current signal or the like according to preprogramed setting information.

While respective image data signals (L and R) from the external device are, in the corresponding displaying process circuits 209L, 209R, digitalized by the A/D converter 210, and supplied to the memory 211. The displaying position control signals are supplied to the respective address generators 214 from the setting data processing circuit 207 in synchronized therewith, and address signals for setting partially required sites or positions on the whole displaying plane of the display elements 204L, 204R as a display range are supplied to the corresponding memory 211 from the respective address generator 214 in accordance with the displaying position control signals, thereby storing whole image data including display range and else the parts in the respective memory 211. The image data of the part without the display range of the image data stored in respective memory 211 are not displayed at all so as to being in black state.

Whole image data stored in each memory 211 are read out with predetermined timing, converted into analog signals in the D/A converter 212, supplied to the corresponding drive circuit 213, and then converted into the display signals, thereby displaying them on the display plane of the corresponding display elements 204L, 204R.

According to this embodiment, the setting on imaging of the stereoscopic image can be performed simply in the same manner as in the imaging of the fourth embodiment, and whole stereoscopic imaging apparatus can be downsized as compared with that of the fourth embodiment. At the same time, as right and left image data, in addition to the parallax information, the vergence information in accordance with the exhibiting distance of the aimed exhibiting matter can be obtained, so that on viewing the stereoscopic image, the exhibiting condition can be smoothed as compared with that of the fourth embodiment, and thus the stereoscopic image can be viewed with less physical disorder feeling and with the stable fusing condition.

FIG. 11 shows a displaying section of the stereoscopic image display apparatus according to the present invention as a sixth embodiment. In this embodiment, the apparatus further comprises vergence adjusting sections 215L, 215R which are connected to the display elements 204L, 204R, respectively. The vergence control signals are generated from the setting data processing circuit 207 in accordance with the distance data signals, the corresponding display elements 204L, 204R are moved in the directions substantially parallel to respective optical axes of the display lens systems 203L, 203R by the vergence adjusting sections 215L, 215R according to the vergence control signals, thereby performing the vergence adjusting. The other construction is the same as that of the second embodiment, so that its detailed explanation is omitted. Respective drive systems and the circuit systems are supplied with necessary supply power from the power supply source of the apparatus (not shown).

Hereinafter, the operation of the sixth embodiment is explained. In this case, the basic function is the same as that of the fifth embodiment, so that only its difference points are explained. In this embodiment, the setting data processing circuit 207 outputs displaying position control signals and the vergence control signals are outputted with a timing in which the vergence condition of the image displayed on the display elements 204L, 204R and the diopter condition by the diopter adjusting section 215L, 215R are linked to each other, thereby supplying diopter control signals to the diopter adjusting sections 215L, 215R, respectively. In this case, these diopter control signals are outputted in the form of pulse signal, voltage-current signal or the like in such a manner that the diopter condition can be changed in accordance with the preprogramed setting information. Concretely, if the exhibiting distance of the aimed exhibiting matter is in at short distance, the display elements 204L, 204R are moved to the side of the display lens systems 203L, 203R as compared with the case of long distance.

In this embodiment, the display elements 204L, 204R are moved in the direction substantially parallel to respective optical axes of the display lens systems 203L, 203R, thereby effecting the diopter adjusting, but the diopter adjusting can be performed by driving focusing lenses of the display lens systems 203L, 203R. In this case, as a focusing lens, a liquid crystal lens, an elastic lens, and a phase modulating lens can be used.

According to this embodiment, the setting on imaging of the stereoscopic image can be performed simply in the same manner as in the imaging of the fifth embodiment. At the same time, as right and left image data, in addition to the parallax information, the vergence information in accordance with the exhibiting distance of the aimed exhibiting matter and the diopter information (adjusting information of eyes) can be obtained, so that on viewing the stereoscopic image, the exhibiting condition can be smoothed as compared with that of the fifth embodiment, and thus the stereoscopic image can be viewed with less physical disorder feeling and with the sufficiently stable fusing condition.

The above stereoscopic imaging apparatus and the stereoscopic image display apparatus may be used separately, or with a combination thereof. In a tele-existence or the like, in a combination of the stereoscopic imaging apparatus and the stereoscopic image display apparatus, the stereoscopic imaging apparatus does not often use a lateral moving mechanism of respective imaging ranges of the imaging elements 103L, 103R and the image planes 110L, 110R. In this case, in addition to the distance data, the imaging field angle and the basic line length of the right and left imaging lens systems 102L, 102R are supplied to the stereoscopic image display apparatus from the stereoscopic imaging apparatus, thereby laterally moving the display elements 204L, 204R and the right and left display range in accordance with these data. In this case, providing that the basic line length of right and left imaging lens systems 102L, 102R outputted from the stereoscopic imaging apparatus is d, and the imaging field angle is θ, and that the interpupillary distance length of the right and left display lens systems 203L, 203R in the stereoscopic image display apparatus is d', the displaying distance is l', the lateral width of the displaying range of the display plane is a', and displaying field angle is θ', a spacing Δ' moving the display elements 204L, 204R and the right and left displaying ranges laterally is Δ={a'/(2l')}·(d/θ−d'/θ'). In this case, if the spacing Δ' is negative, the display elements 204L, 204R may be made narrow. According to the above construction, the construction of the stereoscopic imaging apparatus can be made simplified, and the stereoscopic image display apparatus can displays the stereoscopic image corresponding to various stereoscopic imaging apparatus.

Contrary, in the stereoscopic image display apparatus, the lateral movement mechanism for display elements 204L, 204R and the right and left display planes may also be omitted. In this case, the lateral movement must be adjusted at the side of the stereoscopic imaging apparatus so as to obtain the correct vergence angle, and providing that the imaging distance is l, and the lateral width of the imaging range of the imaging planes 110L, 110R is a, the spacing Δ for laterally moving the imaging elements 103L, 103R or the right and left imaging range for performing such an adjustment may be Δ={a/(2l)}·(d'/θ'−d/θ). In this case, when the interpupillary distance length is about 65 mm and substantially constant, only the display field angle θ' in the stereoscopic image display apparatus is inputted into the stereoscopic imaging apparatus. Moreover, display field angle data and the interpupillary distance length data are supplied to the stereoscopic imaging apparatus from the stereoscopic image display apparatus. According to the above construction the construction of the stereoscopic image display apparatus can be simplified, and the stereoscopic image corresponding to various stereoscopic image display apparatus can displayed by the stereoscopic imaging apparatus.

Figure 13A:
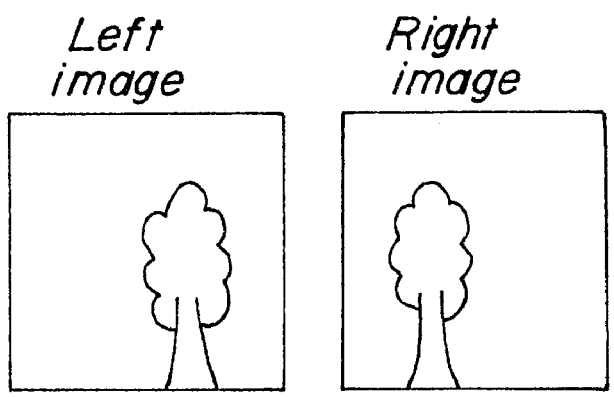
FIGS. 13A and 13B are explanatory views showing image signals in the stereoscopic image displaying apparatus shown in FIG. 12.
Figure 13B:
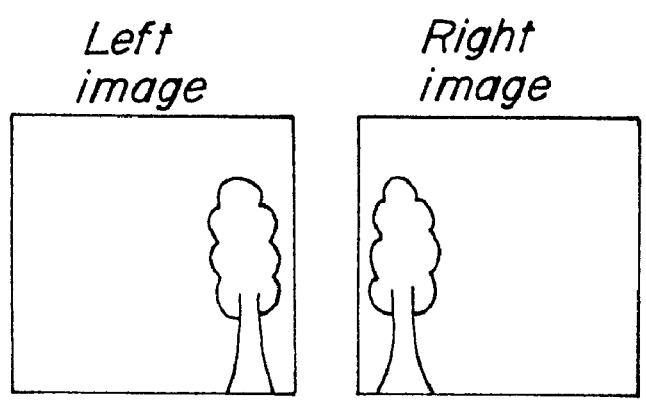

FIG. 12 shows a displaying section of the stereoscopic image display apparatus according to the present invention as a seventh embodiment. In this embodiment, as shown in FIG. 12, the stereoscopic image display apparatus comprises right and left image displaying sections 301L, 301R, which are constructed by a liquid crystal display (hereinafter, referred to as LCD). These LCDs 301L, 301R receive image signals as shown in FIGS. 13A and 13B from controllers 302L, 302R, respectively, and its positions are adjusted in the optical axis directions by motors 303L, 303R to which diopter adjusting signals are inputted together with the image signals (diopter adjusting mechanism), so that these image signals and the diopter adjusting signals are lead to right and left eyes 305L, 305R of a viewer through ocular optical systems 304L, 304R, and thus the stereoscopic images are projected with magnified condition in the air as a virtual image and viewed on the right and left eyes 305L, 305R of the viewer due to binocular parallax.

In the stereoscopic viewing, the vergence angle is adjusted in accordance with a relative positional relation between an object to be viewed and right and left eyes of the viewer. That is, the position in the optical axis direction (arrow directions in FIG. 12) of the LCDs 301L, 301R is adjusted by the operation of the motors 303L, 303R according to the diopter adjusting signals, so that the LCDs 301L, 301R become a concave mirror condition and thus the vergence angle and the diopter become large (i.e., changed in the positive direction), in the case of displaying the image of the object to be viewed at short distance as shown in FIG. 14B rather than in the case of displaying the image of the object to be viewed at long distance as shown in FIG. 14A. Therefore, the images having parallax shown in FIGS. 13A, 13B are displayed as right and left image signals, and the LCDs 301L, 301R are moved in its optical axes so as to obtain the diopter adapted to its parallax, so that the vergence and the diopter can be made coincident to each other as shown in FIGS. 14A and 14B, and thus the viewer does not feel physical disorder feeling.

In this embodiment, the position of the LCDs 301L, 301R is moved to the right and left eyes 305L, 305R in the optical axis direction, and the materials capable of changing refractive index, such as liquid crystal or the like are used as an optical member, to change the refractive index electrically by adjusting its applying voltage, thereby performing the diopter adjustment.

The system for generating the diopter adjusting signals is explained with respect to FIGS. 15A and 15B.

As shown in FIG. 15A, the system comprises two right and left cameras 306L, 306R as a stereoscopic imaging camera, and an object to be viewed is imaged by two right and left cameras to obtain an image having parallax for right and left eyes. The stereoscopic imaging camera generates right and left video signals and focusing signals according to the distance up to the object to be viewed by an auto focus (AF) mechanism (not shown) accommodated in the camera. The auto focus signals are converted into a diopter adjusting signal by a diopter converter 307 accommodated in the camera (or accommodated in the other device) as shown in FIG. 15B.

Figure 16:
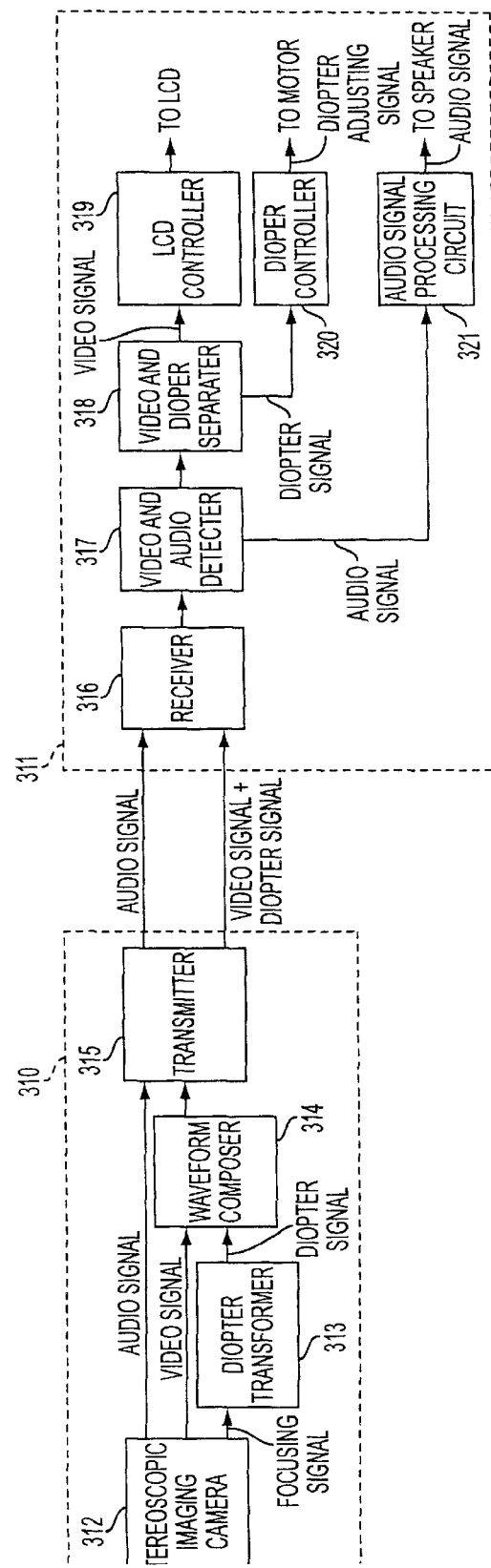
FIG. 16 is an explanatory view showing eighth embodiment of the construction of a head-mounted stereoscopic image displaying apparatus according to the present invention.

FIG. 16 shows a displaying section of the stereoscopic image display apparatus according to the present invention as an eighth embodiment. In this embodiment, the portion with respect to the video signal and the diopter signal is the same as that of the seventh embodiment, but the point of transmitting audio signal in addition to the video signal and the diopter signal to the viewer is different from the seventh embodiment.

The head-mounted image display apparatus shown in the eighth embodiment comprises a video forming device 310 and a video signal processing device 311, and the video forming device 310 comprises a stereoscopic imaging camera 312, a diopter transformer 313, a waveform composer 314 and a transmitter 315. The diopter transformer 313 converts a focus signal inputted from the stereoscopic imaging camera 312 into a diopter signal, thereby inputting it in the waveform composer 314. This diopter signal is superimposed to the video signal inputted from the stereoscopic imaging camera 312 in the waveform composer 314. In this case, it is preferable for the signal superimposing method to superimpose the signals during vertical blanking period of the video signal. The video signals superimposing the diopter signal are transmitted to the video signal processing device 311 together with the audio signals inputted from the stereoscopic imaging camera 312 by the transmitter 315.

The video signal processing device 311 comprises a receiver 316, a video/audio detector 317, a video/diopter waveform separator 318, an LCD controller 319, a diopter controller 320 and an audio signal processing circuit 321. The audio signal and video signal including the diopter signal receiver in the receiver 316 are supplied to the video/audio detector 317 to extract only the audio signals to be supplied to the audio signal processing circuit 321, and then, supplied to the video/diopter waveform separator 318 to extract only the diopter signal of the video signals to be supplied to the diopter controller 320, and finally the remained video signals are supplied to the LCD controller 319. The inputted audio signals are subjected to a signal processing in the audio signal processing circuit 321, and supplied to a loudspeaker (refer to FIG. 18). The diopter controller 320 converts the inputted diopter signals into diopter adjusting signals and supplied to the motors 303L, 303R shown in FIG. 12, and the LCD controller 319 transmits the inputted video signals to the LCDs 301L, 301R shown in FIG. 12. The conversion of the diopter signal into the diopter adjusting signal may be performed linearly or stepwise by dividing it into a plurality of steps.

Figure 17:
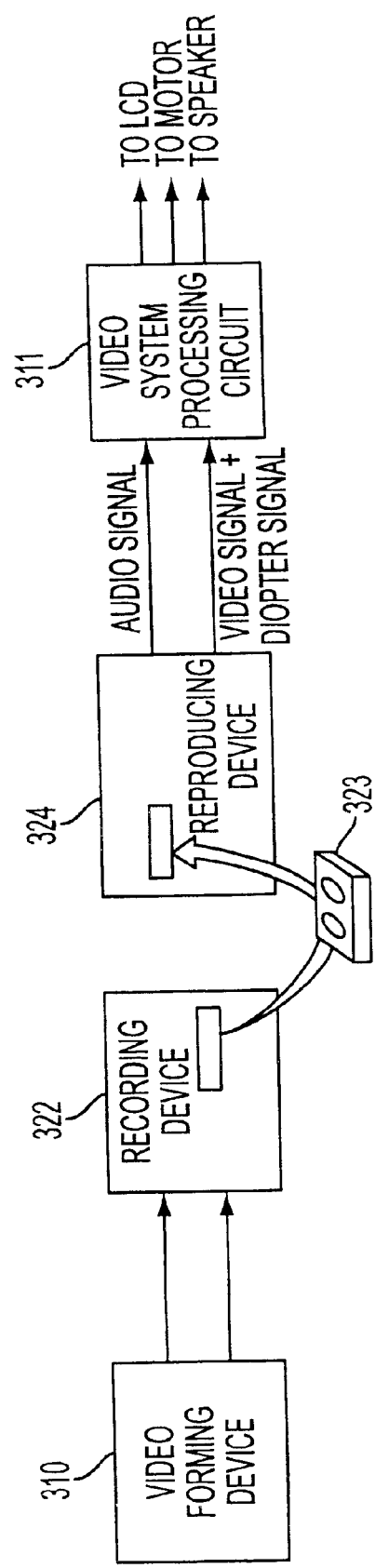
FIG. 17 is an explanatory view showing the construction of recording the formed image temporally in the apparatus shown in FIG. 16.
Figure 18:
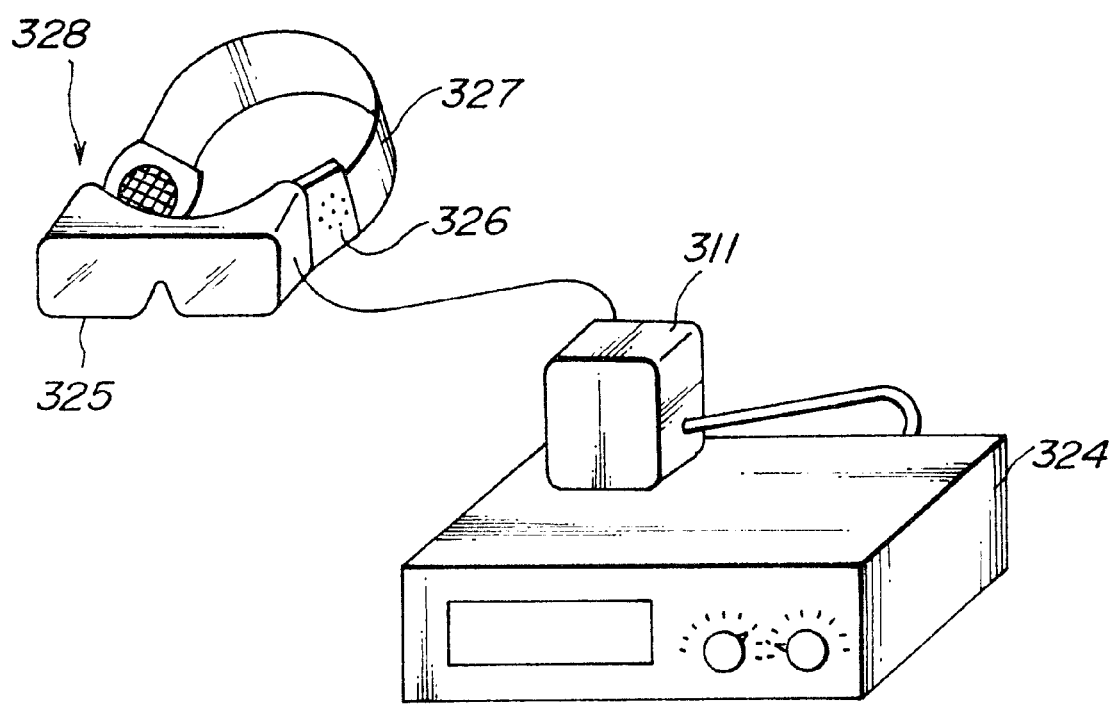
FIG. 18 is a perspective view showing the apparatus placed at the viewer side of the apparatus shown in 16.

In the construction shown in FIG. 16, the images formed by the video forming device 310 are transmitted directly to the video signal processing device 311, but as shown in FIG. 17, the image information including the diopter signals, the video signals and the audio signals formed by the [image forming device 310] are once recorded on a record carrier (for example, video tape) 323 by a recording device 322, when the viewing is performed by a viewer, the record carrier 323 may be subjected to a reproducing process by a reproducing device 324. In this case, as shown in FIG. 18, the viewer may prepare a head-mounted image display apparatus 328 comprising the reproducing device (for example, video deck) 324, the video signal processing device 311, a display device 325, a head phone 326, and a holding member 327 or the like, thereby constituting a compact image display system separating the video forming device 310.

Figure 19:
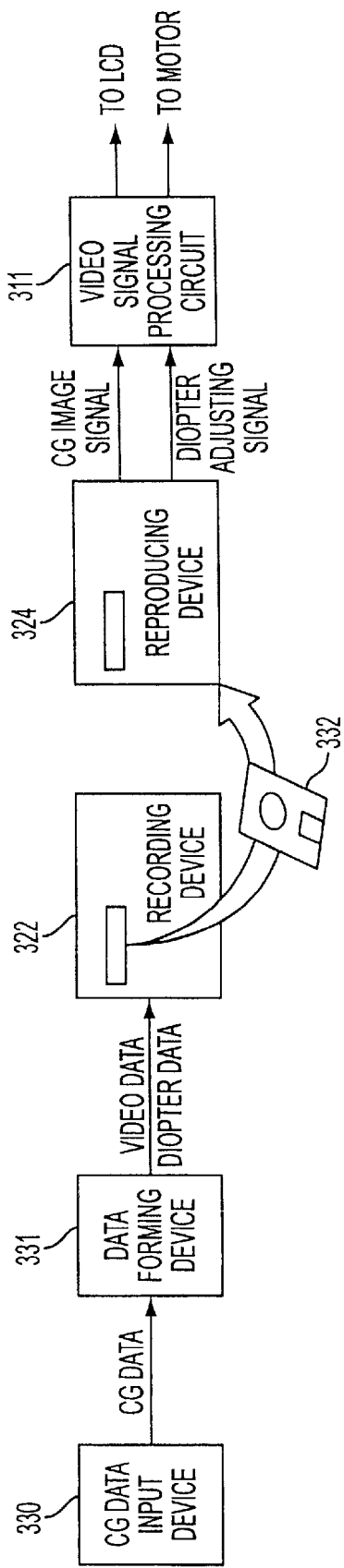
FIG. 19 is an explanatory view showing ninth embodiment of the construction of a head-mounted stereoscopic image displaying apparatus according to the present invention.

FIG. 19 shows a displaying section of the stereoscopic image display apparatus according to the present invention as a ninth embodiment. In this embodiment, as shown in FIG. 19, the image display apparatus comprises a computer graphics data (CG data) input device 330 and a data forming device 331 instead of the video forming device 310 used in the eighth embodiment in FIG. 17, thereby forming the image by the image processing with the use of CG technics instead of forming the image for stereoscopic viewing from the image picked-up by the camera or the like as shown in the eighth embodiment.

In FIG. 19, when CG data corresponding to required CG image from the CG data input device 330 are supplied to a data forming device 331, the data forming device 331 forms right and left image data viewed from right and left eyes having predetermined interpupillary distance, and the diopter data representing the depth in accordance with the CG data. These right and left image data and the diopter data are a recording medium (opto-magnetic disk; MO or floppy disk or the like) 332 by a recording device 322. The recording medium 332 is inserted into the reproducing device 324 to reproduce respective data and to convert into CG image signal, and then output them to the data forming device 331.

Figure 20:
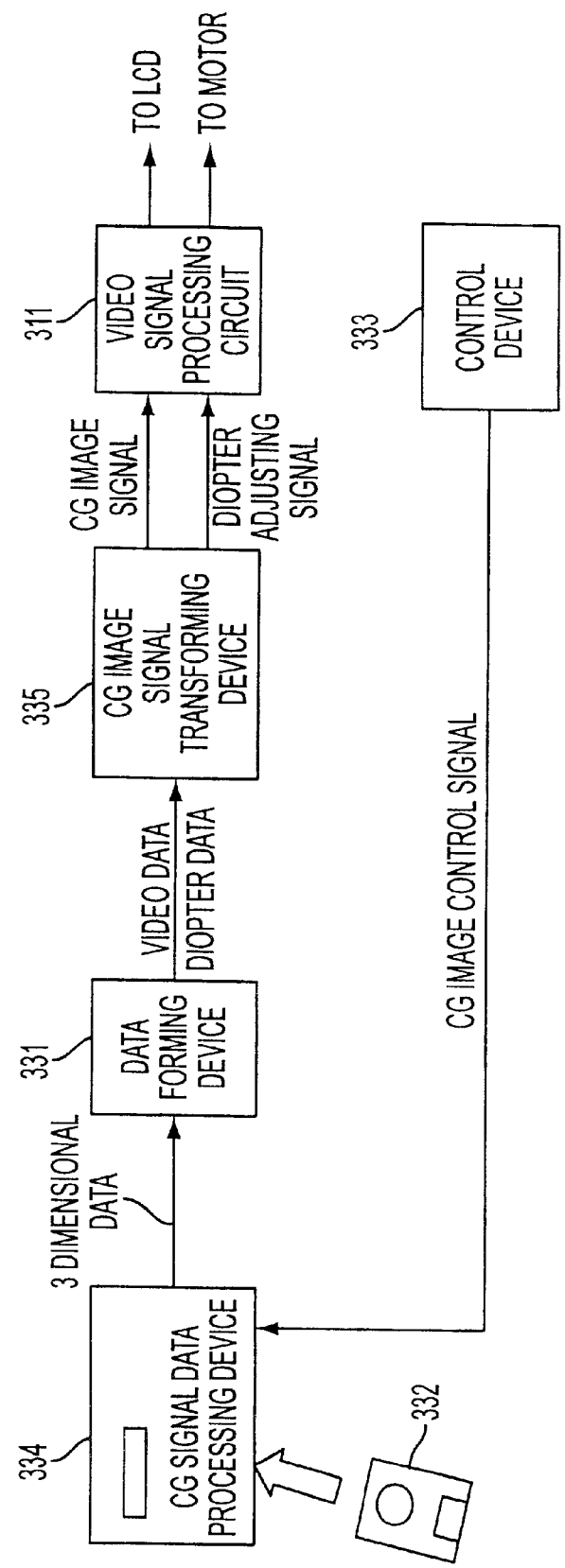
FIG. 20 is an explanatory view showing the construction of the apparatus shown in FIG. 19 in the case corresponding to a computer graphics.

The image display system of the ninth embodiment can be corresponded to the virtual reality as follows. That is, as shown in FIG. 20, a control device 333 (a feedback glove, a mouth, a joy stick or the like) operated by the viewer wile viewing the displayed image (CG image), is provided, thereby inputting CG image control signals to a CG image data processing device 334 from the control device 333. When the CG image control signals are inputted, the CG image data processing device 334 selects required three dimensional data corresponding to the CG image control signals from a plurality of three dimensional video data which has been read out from the recording medium 332, and supplied to the data forming device 331. The data forming device 331 forms right and left image data and the diopter data in accordance with the three dimensional data and supplied to a CG image signal transforming device 335, and the CG image signal transforming device 335 converts respective data into CG image signals and supplied to the video signal processing device 311.

Figure 21:
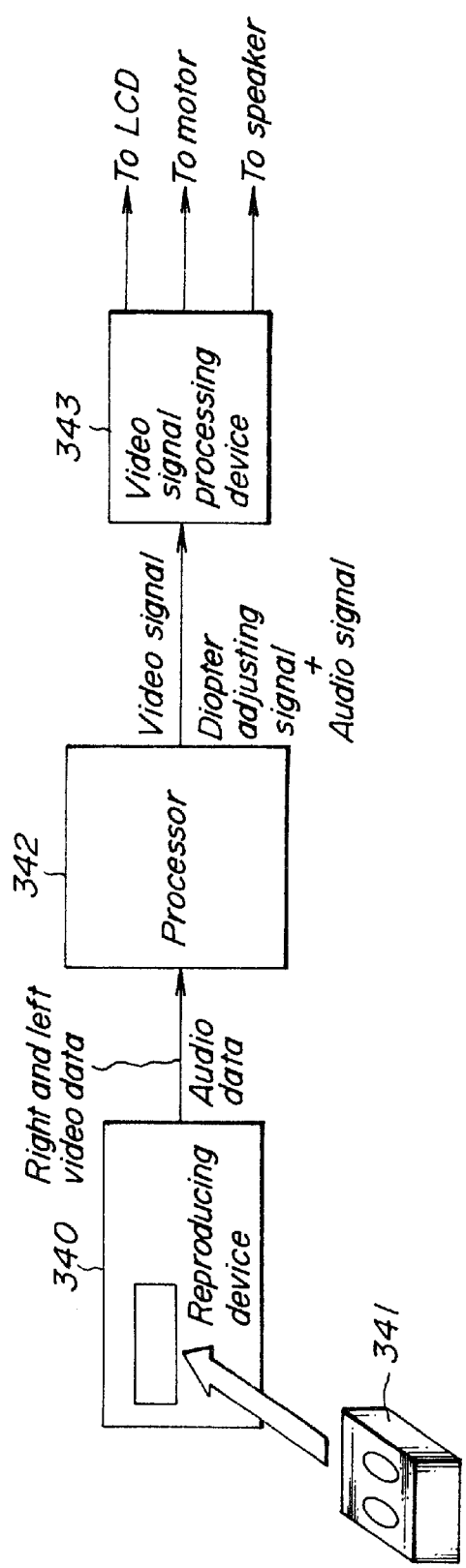
FIG. 21 is an explanatory view showing tenth embodiment of the construction of a head-mounted stereoscopic image displaying apparatus according to the present invention.

FIG. 21 shows a main portion of the head-mounted image display apparatus according to the present invention as a tenth embodiment. This embodiment corresponds to the construction of the image display apparatus shown in FIG. 18 as the eighth embodiment, and the diopter signal being the signal independent to the image signals in respective embodiments is omitted, and the diopter signals are automatically generated from the image signals by the arithmetic operation.

In FIG. 21, a reproducing device 340 reproduces a record carrier 341, on which right and left images (including audio signals) are recorded, to take out right and left image data and audio data to be supplied to a processor 342 such as CPU. The processor 342 performs a correlation process for the image data to produce the diopter of the object to be viewed, and the calculated diopter signals are supplied to a video signal processing device 343, so that the diopter signals are not necessary to record on the record carrier 341, and thus the video forming device and the recording device can be made simplified.

According to this embodiment, when the stereoscopic images are viewed by displaying different images on the first and second display sections corresponding to the right and left eyes of the viewer, respectively, even if the object at long distance is viewed or the object at short distance is viewed, the diopter adjusting mechanism adjusts the diopter of the first and second image display sections in accordance with the diopter adjusting signals corresponding to parallax or vergence angle caused between the images on the first and second display sections, so that the vergence angle and the diopter are always coincident with each other and thus physical disorder feeling can be canceled due to uncoincidence of the vergence angle and the diopter.

Figure 22:
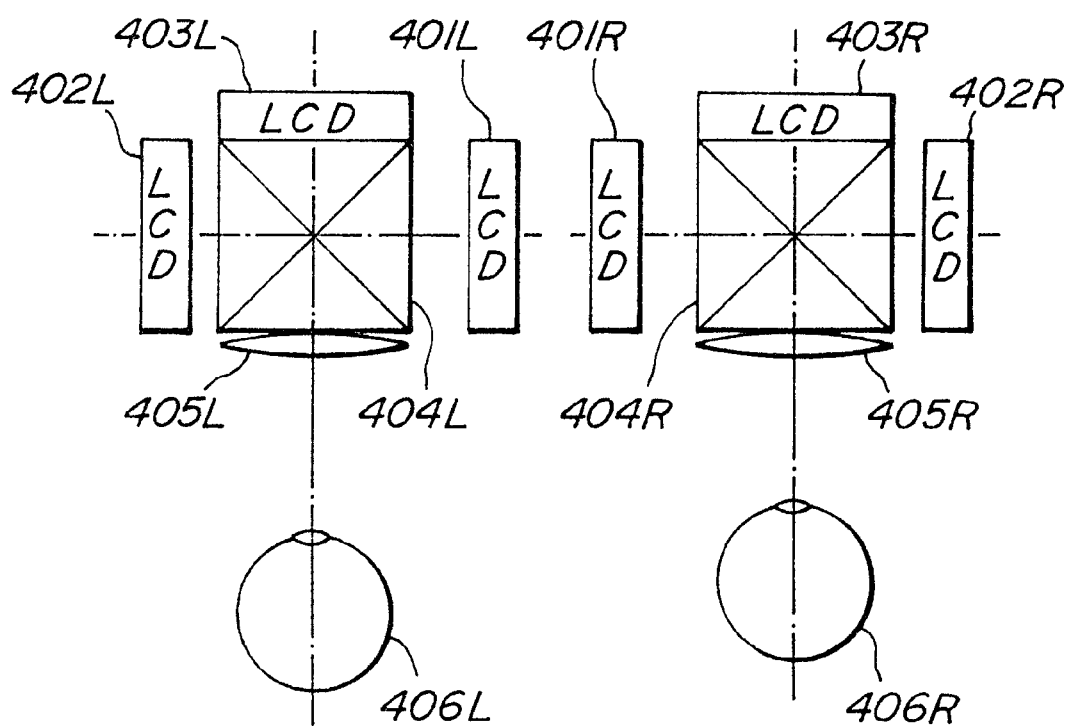
FIG. 22 is an explanatory view showing eleventh embodiment of the construction of a head-mounted stereoscopic image displaying apparatus according to the present invention.

FIG. 22 shows a main portion of the head-mounted image display apparatus according to the present invention as an eleventh embodiment. In this embodiment, as shown in FIG. 22, a right image display means comprises three liquid crystal displays (hereinafter, referred to as LCD)(LCD 401R, LCD 402R, LCD 403R), and a left image display means comprises three liquid crystal displays (LCD 401L, LCD 402L, LCD 403L), and thus optical path lengths for respective LCDs are made different. In order to simultaneously view images from three LCDs on right and left eyes of a viewer, right projecting optical system is formed by a prism 404R and an ocular lens 405R, and a left projecting optical system is formed by a prism 404L and an ocular lens 405L, so that right images are projected on a right eye 406R of the viewer, and left images having parallax to the right images are projected on a left eye 406L of the viewer, thereby forming a magnified projection image for right and left images on front of face of the viewer.

Figure 23:
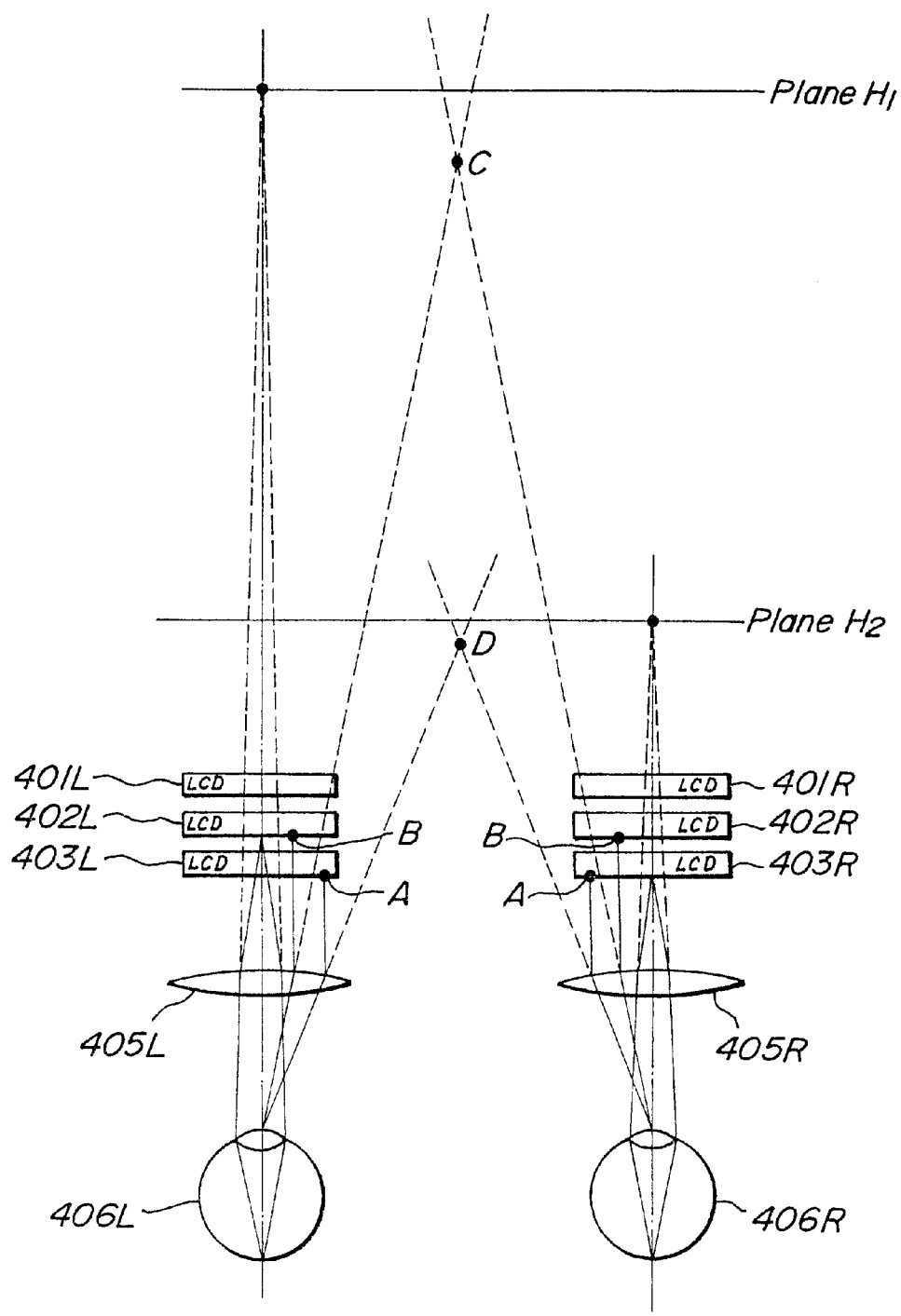
FIG. 23 is an explanatory view showing the means for viewing an object in the stereoscopic image displaying apparatus shown in FIG. 22, in which three optical axes having different optical path length for eyes are arranged in order.

Displaying principle of the object by the head-mounted stereoscopic image display apparatus shown in the eleventh embodiment is now explained with respect to FIG. 23, in which optical axes of three LCDs having different optical path lengths for eyes are represented in order. In this embodiment, the optical path lengths are made different by moving the positions of three LCDs, but these optical path lengths may be made different by respective prisms formed by prisms 404R, 404L (not shown in FIG. 23) having different curvature, respectively.

In FIG. 23, the objects displayed at points A of the LCDs 403R, 403L can be viewed at a point D on a plane H2 on front of the face of the viewer, and the objects displayed at points B of the LCDs 402R, 402L can be viewed at a point C on a plane H1. In this case, the objects displayed on the LCDs 401R, 401L are formed on the infinite points, so that the images of the object displayed on the LCDs 402R, 402L are formed on the plane H1, and the images of the object displayed on the LCDs 403R, 403L are formed on the plane H2.

In this case, the object to be viewed near the plane H2 is displayed on the LCDs 403R, 403L, the object to be viewed near the plane H1 is displayed on the LCDs 402R, 402L, and the object to be viewed far the plane H1 is displayed on the LCDs 401R, 401L, so that the position in the depth direction of the object felt by the viewer due to binocular parallax can be made coincident with the position in the depth direction of the object felt by the viewer due to focal change of eyes, and thus viewer does not feel the physical disorder feeling.

An control system for performing stereoscopic image viewing by projecting different images displayed on the three LCDs on respective right and left eyes is explained with reference to a block diagram of the LCD controller shown in FIG. 24.

Figure 24:
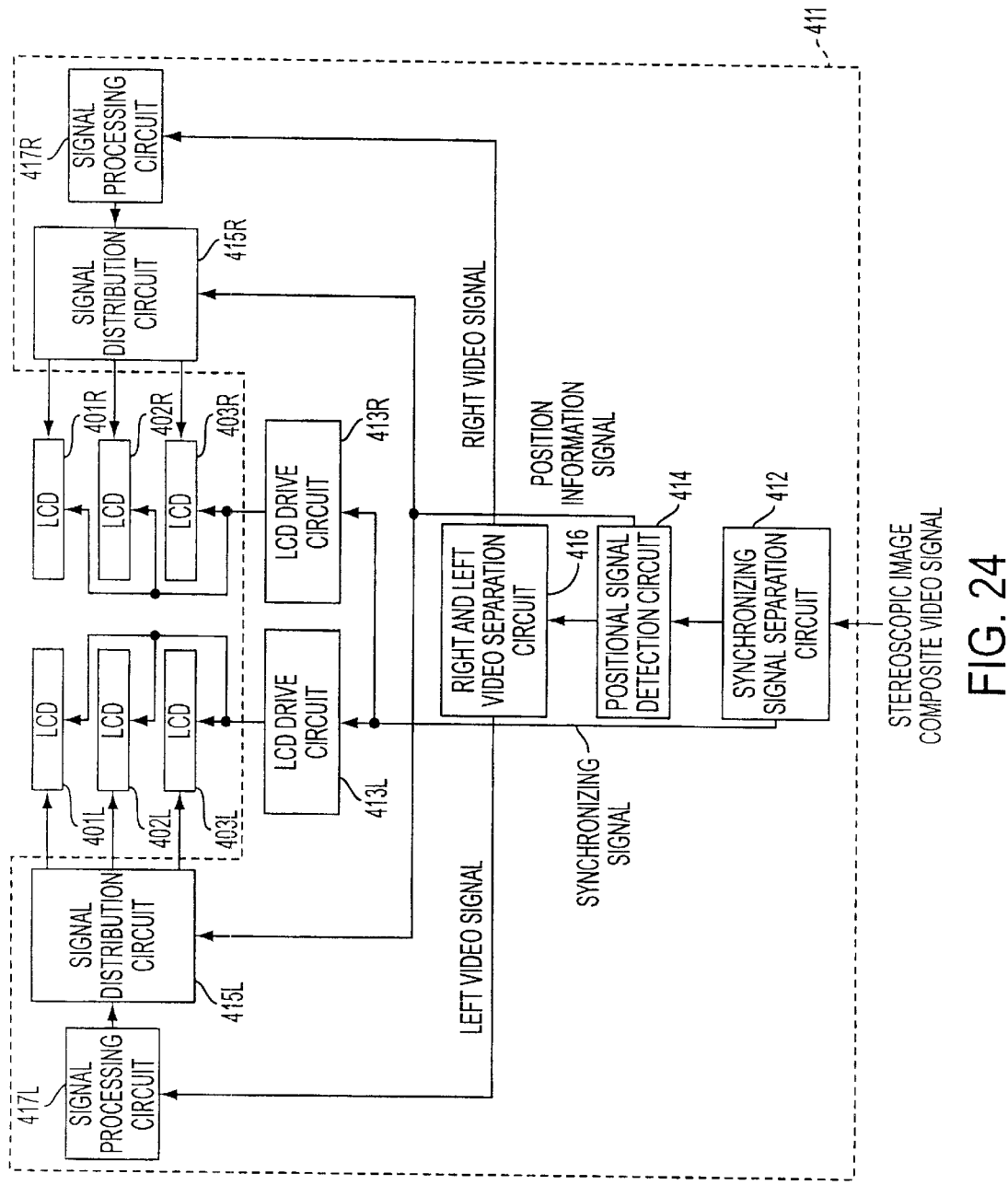
FIG. 24 is a block circuit diagram showing a controller for an LCD used in the head-mounted stereoscopic image displaying apparatus shown in FIG. 22.

A controller 411 shown in FIG. 24 receives stereoscopic image composite video signals including respective signals for performing stereoscopic image viewing. This stereoscopic image composite video signals consist of right image signals, left image signals, synchronizing signals and positional information signals, for example, odd fields are made right imaging signals and even fields are made left imaging signals. These composite signals are supplied by for example a video camera.

In FIG. 24, the stereoscopic image composite video signals are supplied to a synchronizing signal separation circuit 412. The synchronizing signal separation circuit 412 separates only synchronizing signals to be supplied to LCD drive circuits 413R, 413L, and residue signals are supplied to a positional information detection circuit 414. The positional information detection circuit 414 separates only the positional information signals to be supplied to signal distribution circuits 415R, 415L, and residue signals are supplied to a right and left video separation circuit 416. The positional information signals represent positional information in the depth direction of the object imaged during horizontal blanking periods or vertical blanking periods. As a positional information signal, a focusing signal from the video camera can be used.

The right and left video separation circuit 416 separates the residual signals into right and left imaging signals to be supplied to signal processing circuits 417R, 417L, respectively. The signal processing circuits 417R, 417L processes the inputted right and left imaging signals to LCD signals to be supplied to the signal distribution circuits 415R, 415L, and the signal distribution circuits 415R, 415L distribute the right and left imaging signals to the corresponding LCDs in accordance with the positional information signals.

This image display means can perform the display position of the image different in the depth direction, and the position in which the viewer feels the presence of the objection due to binocular parallax and the focusing position of eyes at this time can be coincided with each other.

In the above case, if the focusing signals are used as a positional information, only one positional information is obtained per one image surface, and thus the construction in which three LCDs are provided, can not be sufficiently utilized, so that one image plane is divided into a plurality of subimage planes, and focusing signals can be obtained per each divided image plane. Therefore, the object can be displayed by changing the depths every respective divided image planes of one image plane.

In this case, as a method of dividing the image, in the case of computer graphics, the method of distributing the corresponding images every different depths can be used, and in the case of the images due to video camera imaging, methods of distributing the images having high unfocusing precision and with respective depths every depth, or the method of dividing the obtained images into a plurality of subimages, and of distributing the divided images according to the adapted depth can also be used.

Figure 25:
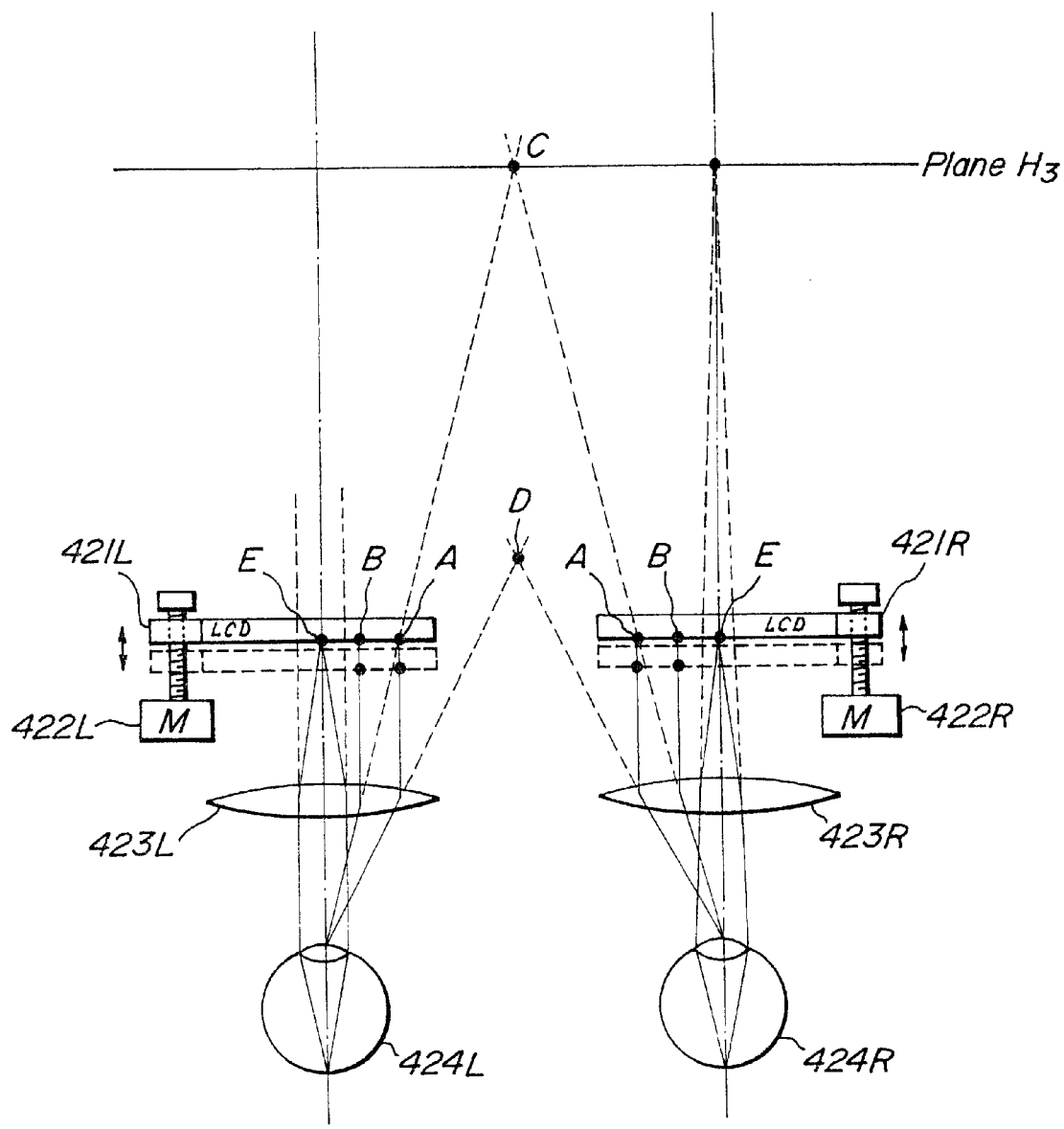
FIG. 25 is an explanatory view showing twelfth embodiment of the construction of a head-mounted stereoscopic image displaying apparatus according to the present invention.

FIG. 25 shows a head-mounted image displaying apparatus of the present invention as a twelfth embodiment. In this embodiment, a right image display means for displaying the right images comprises an LCD 421R, and a left image display means for displaying the left images comprises an LCD 421L, and the light path lengths of the LCDs 421R, 421L for eyes may be changeable in the depth directions by motors 422R, 422L. A right projection optical system for leading the right images from the LCD 421R on an eye 424R of the viewer is constructed by an ocular lens 423R, and left projecting optical system for leading the left images from the LCD 421L having parallax for the right image on the left eye 424L of the viewer is constructed by an ocular lens 423L, thereby forming magnified and projected image of the right and left images on front of face of the viewer.

Then, displaying principle of the object by the head-mounted stereoscopic image display apparatus shown in the eleventh embodiment is now explained with respect to FIG. 25. In FIG. 25, the objects displayed at points A of the LCDs 421R, 421L can be viewed at a point D on front of the face of the viewer due to binocular parallax and the objects displayed at points B of the LCDs 421R, 421L can be viewed at a point C on a plane H3. In this case, if the LCDs 421R, 421L are moved to the position shown by dotted line, the focusing position of eyes is also placed on the plane H3, so that the viewer does not feel physical disorder feeling.

That is, when the object to be viewed far the plane H3 (for example, the object displayed on a point E of LCDs 421R, 421L) is displayed, the LCDs 421R, 421L are moved on the position shown in FIG. 25 by a solid line, and when the object to be viewed on the plane H3 is displayed, the LCDs 421R, 421L are moved on the position shown by a dotted line, and when the object to be viewed near the plane H3 (for example, the object displayed on a point A of the LCDs 421R, 421L) is displayed, the LCDs 421R, 421L are moved near the position shown by dotted line, so that the position in the depth direction of the object felt by the viewer due to binocular parallax can be made coincident with the position in the depth direction of the object felt by the viewer due to focal change of eyes, and thus viewer does not feel the physical disorder feeling.

Then, the control system for performing stereoscopic image viewing by projecting different images displayed on respective right and left eyes is explained with reference to a block diagram of the LCD controller shown in FIG. 26.

Figure 26:
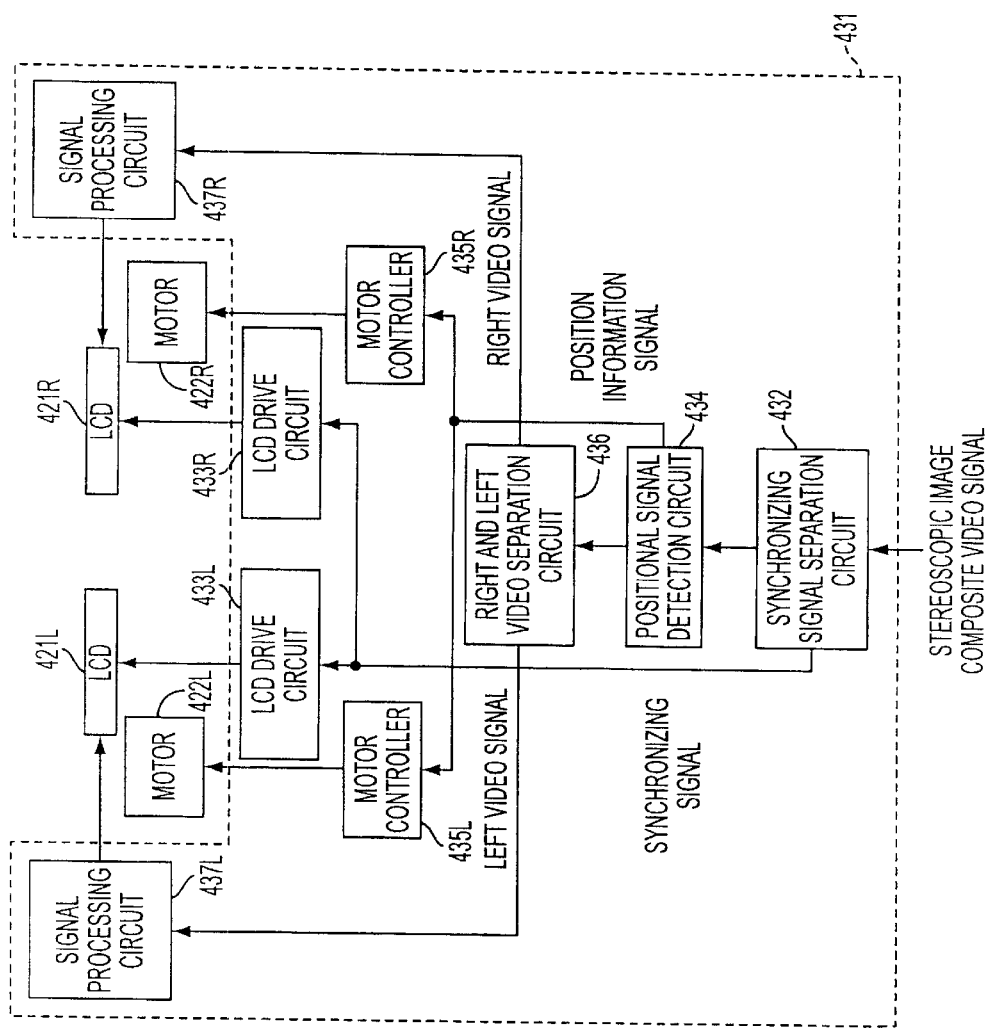
FIG. 26 is a block circuit diagram showing a controller for an LCD used in the head-mounted stereoscopic image displaying apparatus shown in FIG. 25.

A controller 431 shown in FIG. 26 receives stereoscopic image composite video signals including respective signals for performing stereoscopic image viewing. These stereoscopic image composite video signals consist of right image signals, left image signals, synchronizing signals and positional information signals, for example, odd fields are made right imaging signals and even fields are made left imaging signals. These composite signals are supplied by for example a video camera.

In FIG. 26, the stereoscopic image composite video signals are supplied to a synchronizing signal separation circuit 432. The synchronizing signal separation circuit 432 separates only synchronizing signals to be supplied to the LCDs 421R, 421L through right and left LCD drive circuits 433R, 433L, and residual signals are supplied to a positional information detection circuit 434. The positional information detection circuit 434 separates only the positional information signals to be supplied to the motors 422R, 422L through right and left motor controllers 435R, 435L and residual signals are supplied to a right and left video signal separation circuit 436. The positional information signals represent positional information in the depth direction of the object imaged during horizontal blanking periods or vertical blanking periods. As a positional information signal, a focusing signal obtained every divided imaging planes in case of dividing one imaging plane into a plurality of subimaging planes in the same manner as in the eleventh embodiment can be used, and the positional information may be generated from the positional relations in the depth direction of the object to be displayed by using image processing technique.

The right and left video separation circuit 436 separates the residual signals into right and left imaging signals to be supplied to signal processing circuits 437R, 437L, respectively. The signal processing circuits 437R, 437L processes the inputted right and left imaging signals to generate LCD signals to be supplied to the LCDs 421R, 421L, so that the motors 422R, 422L are driven in synchronism with the object to be displayed on the LCDs 421R, 421L by the right and left imaging signals, thereby changing the positions of the LCDs 421R, 421L in the depth direction.

This image display means can change the display position of the image in accordance with the position of the object to be displayed in the depth direction, and the position in which the viewer feels the presence of the object due to binocular parallax and the focusing position of eyes at this time can be coincided with each other.

Figure 27:
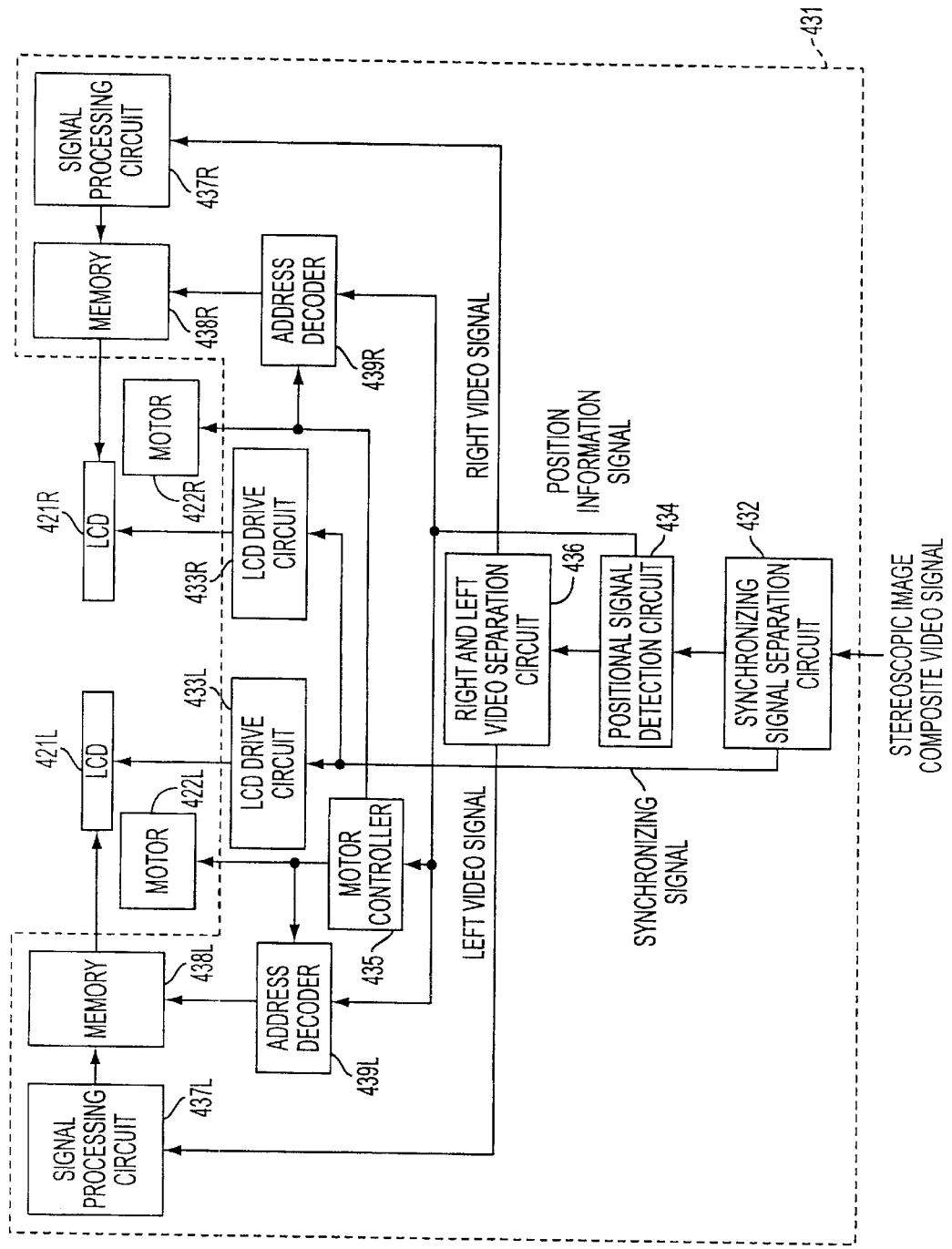
FIG. 27 is a block circuit diagram showing another controller for the LCD used in the head-mounted stereoscopic image displaying apparatus shown in FIG. 25.

In the block diagram shown in FIG. 26, the LCDs 421R, 421L are moved in the depth direction in accordance with the position of the object to be displayed in the depth direction, thereby directly displaying right and left images on the moved LCDs, but as shown in FIG. 27, the inputted right and left imaged signals are once recorded on memories 438R, 438L, and the motors 422R, 422L may be subjected to only reciprocal movement by instructions from the motor controller 435. In this case, only the data stored in the address position corresponding to the display position of the right and left imaging signals can be read out from the memorized 438R, 438L in accordance with the display position in the depth direction instructed from right and left address decoders 439R, 439L in which the positional information signals are inputted.

In the eleventh and the twelfth embodiments, the positional adjustment in the depth direction of the object to be displayed is performed by making the optical path lengths of three LCDs for the right and left eyes different, and by moving the position in the depth direction of right and left LCDs for the eyes, but the present invention is not limited thererto, for example, the depth adjustment may be performed by changing the refracting index electrically in such a manner that for example, the projection optical system is made movable in the depth direction for the right and left eyes, or the applied voltage or the like are adjusted by using the liquid crystal optical system capable of changing the refraction index for the position adjustment in the depth direction.

In the twelfth embodiment, a liquid crystal optical system for the optical path length adjustment is provided instead of the motor for position adjustment of the LCD, the imaging plane of the liquid crystal optical system is divided into a plurality of subimaging planes, and the positional information signals are inputted on the subimaging planes, thereby adjusting the refraction index in accordance with the position in the depth direction of the object to be displayed every respective subdivided imaging planes.

According to the eleventh and twelfth embodiments, when the stereoscopic image is viewed by displaying different images on the right and left eyes of the viewer, the images displayed on the right and left image display means is divided per depths by the image division means at the formation of the image having a plurality of different depths, the depth adjusting means adjusts the depth in order to display images having a plurality of different depths every depths, so that even if the object displayed at long distance is viewed, or even if the object displayed at short distance is viewed, the position in which the object to be displayed is displayed and the unfocusing position at that time, are coincided with each other and thus viewer does not feel the physical disorder feeling.

Figure 28:
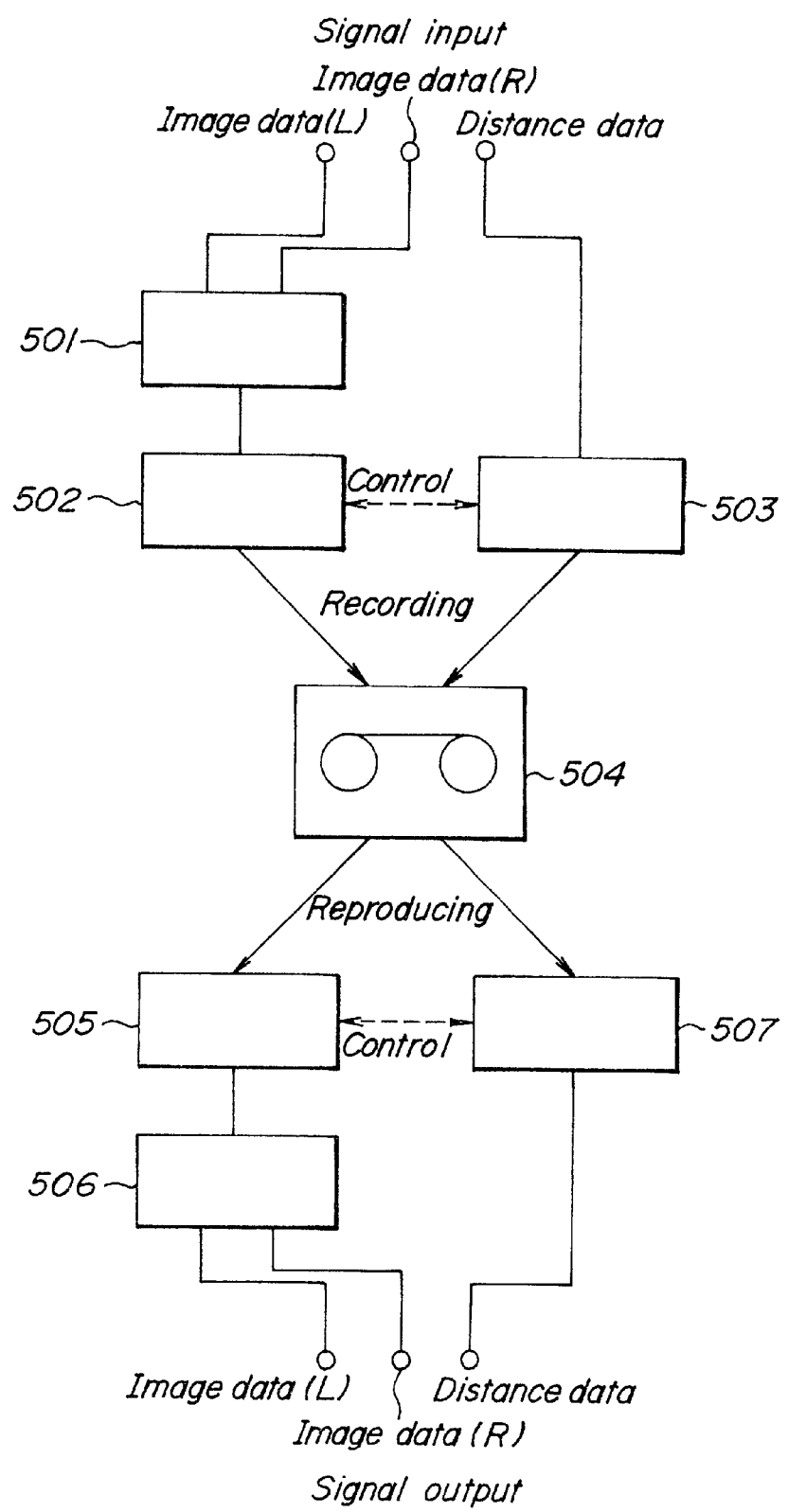
FIG. 28 is an explanatory view showing thirteenth embodiment of the construction of a recording section and reproducing section of a stereoscopic image recording and reproducing apparatus according to the present invention.

FIG. 28 shows recording and reproducing sections of a stereoscopic image recording and reproducing apparatus according to the present invention as a thirteenth embodiment. In this embodiment, the recording system comprises a recording time division processing circuit 501, an image recording section 502, and a distance data recording section 503 and the reproducing system comprises an image reproducing section 505, a reproducing time division processing circuit 506 and a distance data reproducing section 507. In this embodiment, also, a magnetic tape 504 is used as a recording medium. The recording time division processing circuit 501 is connected to the image recording section 502, and the image recording section 502 is connected to the distance data recording section 503. The image reproducing section 505 is connected to the reproducing time division processing circuit 506 and the distance data reproducing section 507, respectively. The drive system of the magnetic tape 504 and respective circuit system are supplied to the required supply power from the apparatus.

Figure 29:
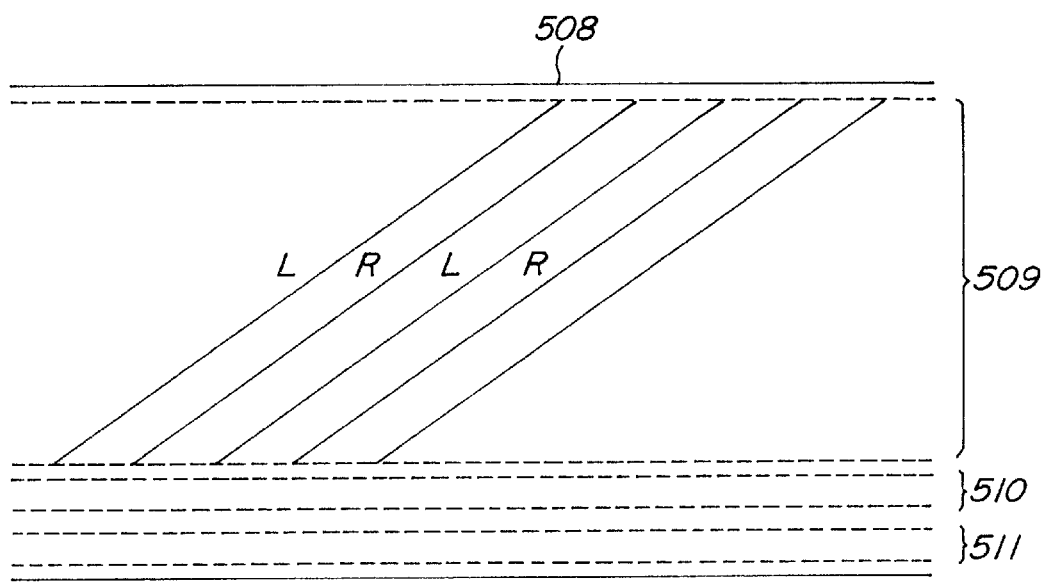
FIG. 29 is an explanatory view showing the operation of the recording section and the reproducing section shown in FIG. 28.

Hereinafter, the operation of the recording and reproducing apparatus according to the present invention is explained with reference to FIG. 29. The image data and the distance data are explained at first. The right and left image data are supplied to the recording time division processing circuit 501 from the external device, and subjected to a time division processing and then supplied to the image recording section 502, alternately. The right and left image data signals supplied on the image recording section 502 alternately, are converted into signals capable of recording them on a image data reserving portion 509 of a magnetic tape section 508. In this embodiment, the right and left image data are alternately recorded on one image data reserving portion 509, but the image data reserving portion is divided into a right image data reserving portion and a left image data reserving portion, and right and left image data may be separately recorded.

The distance data signals are supplied to the distance data recording section 503 and converted them into signals capable of recording them on the magnetic tape 504, and then recorded on a distance data reserving portion 511 of the magnetic tape section 508 under the condition synchronized with the image data. The image data signal and the distance data signal are in the synchronized conditions since these data signals are inputted with substantially same timing, but it is preferable to provide a control means for synchronizing the image recording section 502 with the distance data recording section 503. As data other than the above data, audio data are reserved in an audio data reserving portion 510 of the magnetic tape section 508.

The reproducing operation of the image data and the distance data recorded on the magnetic tape 504 is explained. The right and the left image data recorded on the image data reserving portion 509 of the magnetic tape section 508 are read out alternately by the image reproducing section 505, converted into serial image data signals, and supplied to the reproducing time division processing circuit 506, so that the reproducing time division processing circuit 506 separates the serial image data signals into right and left image data signals which are outputted to the external device. The distance data corresponding to the image data read out in the image reproducing section 505 are read out in the distance data reproducing section 507 in synchronized with the read out of the image data, and converted into the distance data therein, and then outputted to the external device together with the image data signals. The image data and the distance data has been recorded on the magnetic tape 504, so that these data can be read out in synchronized with each other in the reproducing process. Therefore, it is preferable to provide a control means for performing the timing between the image reproducing section 505 and the distance data reproducing section 507, or in the output section.

According to this embodiment, the condition setting at the recording and the reproducing of the stereoscopic image can be made simplified, and whole stereoscopic image recording and reproducing apparatus can be downsized. Moreover, the right and left image data and the distance data of the aimed exhibiting matter are recorded on the record carrier under the synchronized condition, so that the recording and the reproducing can be performed under the conditions including the information of the binocular vergence and adjusting function of eyes, in addition to the information of the image data as stereoscopic image data and the binocular parallax. In this embodiment, the right and left image are recorded and reproduced under the time division condition by using the magnetic tape 504 as a recording medium, it may be also adopted the recording system using the opto-magnetic disk, magnetic disk, and the optical disk such as CD-ROM or the like.

Figure 30:
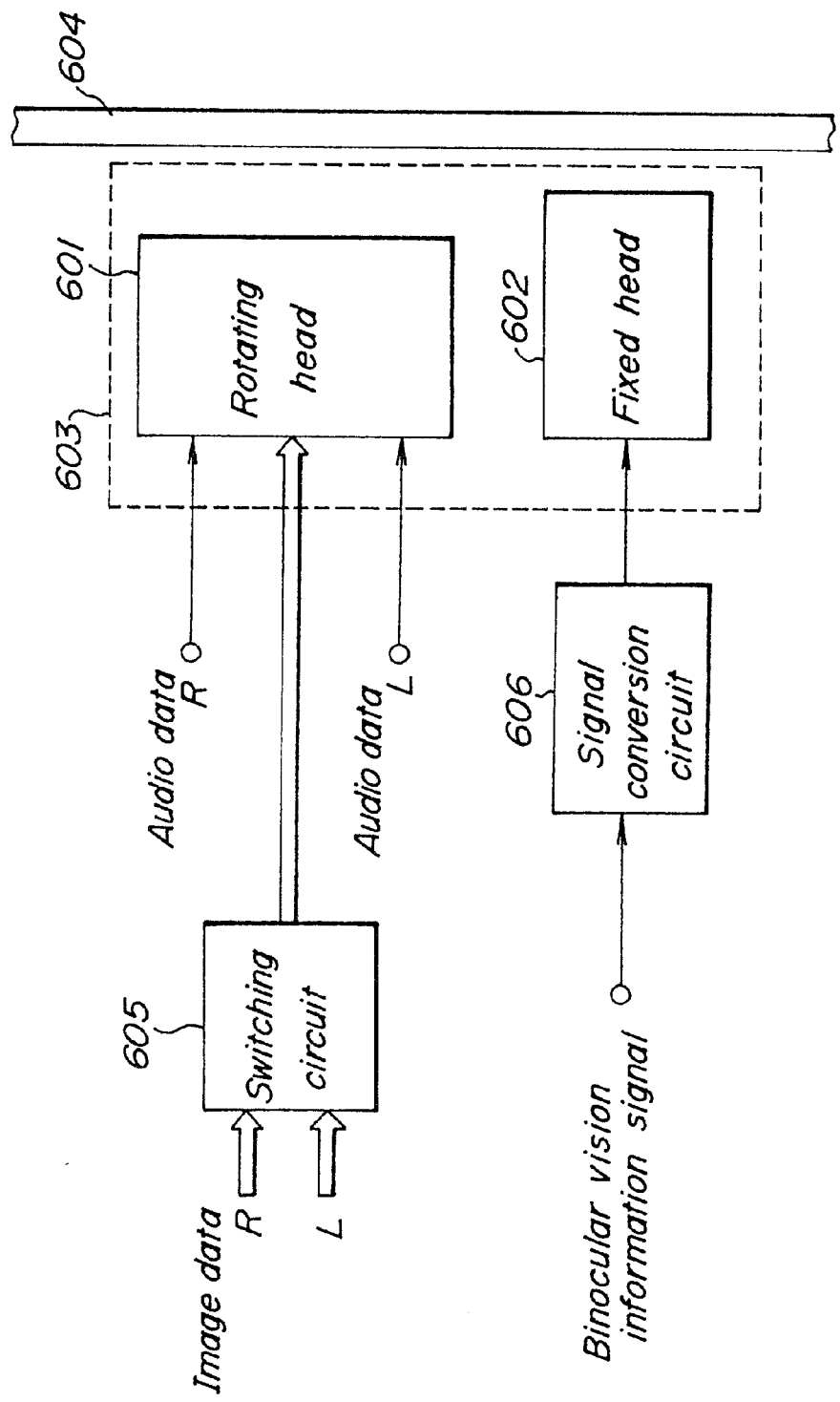
FIG. 30 is an explanatory view showing fourteenth embodiment of the construction of a recording section and reproducing section of the stereoscopic image recording and reproducing apparatus according to the present invention.

FIG. 30 shows recording and reproducing sections of a stereoscopic image recording and reproducing apparatus according to the present invention as a fourteenth embodiment. In this embodiment, a conventional recording and reproducing section 603 having a rotating magnetic head 601 and a fixed magnetic head 602 is utilized to record imaging data, audio data and stereoscopic vision information signals on a magnetic tape 604 with the same recording format as the conventional one, and to reproduce these signals recorded on the magnetic tape 604.

To this end, in this embodiment, the right and left image data are supplied to a switching circuit 605 from the external device, and while switching the right and left image data alternately, supplied to the rotating magnetic head 601, to which right and left audio data are also supplied to the rotating magnetic head 601 from the external device, thereby recording these image data and the audio data with high fidelity on the magnetic tape 604 by the rotating magnetic head 601. The stereoscopic vision information signals inputted from the external device in synchronized with the right and left image data are converted (into digital signals) by a signal conversion circuit 606 and supplied to the fixed magnetic head 602, thereby recording them on the audio track of the magnetic tape 604.

The signals recorded on the magnetic tape 604 are read out and reproduced by the rotating magnetic head 601 and the fixed magnetic head 602. In this case, the signal conversion circuit 606 modulates the basic signals having levels corresponding to the audio signal with a frequency suitable for recording them on the fixed magnetic head 602, i.e., a frequency of 100~10000 Hz presented as the audio signal in accordance with the stereoscopic vision information signals.

Figure 31A:
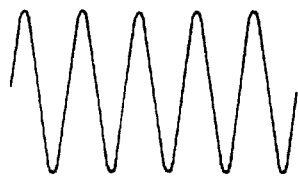
FIGS. 31A~31F are explanatory views showing modulation systems in the signal conversion circuit shown in FIG. 30.
Figure 31B:
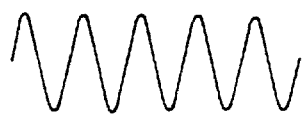
Figure 31C:
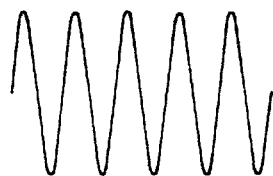
Figure 31D:
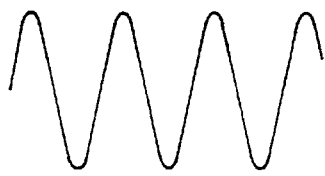
Figure 31E:
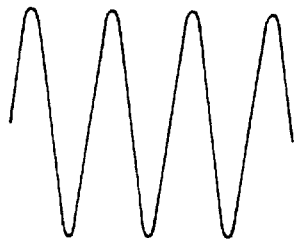
Figure 31F:

FIGS. 31A~31F show explanatory views showing various modulation systems in the signal conversion circuit 606. That is, FIGS. 31A and 31B show an amplitude modulation system, FIGS. 31C and 31D show a frequency modulation system, FIGS. 31E and 31F show a combined modulation system of the amplitude modulation system and the frequency modulation system. In these modulation systems, the basic signals are modulated according to the stereoscopic vision information signals as a sine wave having about 10 KHz around the frequency band of the audio signal.

That is, in the amplitude modulation system, according to the stereoscopic vision information signal, for example, distance data, the amplitude of the basic signal is made large in the case of long distance, as shown in FIG. 31A, and is made small in the case of short distance, as shown in FIG. 31B. If the signals are recorded as in the above, the distance data can be obtained from the amplitude of the signals at reproducing time.

In the frequency modulation system, according to the stereoscopic vision information signal, for example, distance data, the frequency of the basic signal is made high in the case of long distance, as shown in FIG. 31C, and is made low in the case of short distance, as shown in FIG. 31D. If the signals are recorded as in the above, the distance data can be obtained from the frequency of the signals at reproducing time. In the frequency modulation system, also, the stereoscopic vision information can be selected by the frequency band, and thus a plurality of the stereoscopic vision information can be designated and selected therefrom.

In the combined modulation system of the amplitude modulation system and the frequency modulation system, the amplitude of the basic signal is modulated in such a manner that according to, for example, the vergence angle data of the stereoscopic vision information, the amplitude is made large in the case of large vergence angle, and is made small in the case of small vergence angle. Moreover, in the combined modulation system, the frequency of the basic signal is modulated in such a manner that according to, for example, the distance data of the stereoscopic vision information, the frequency is made high in the case of long distance, and is made low in the case of short distance. If the signals are modulated as in the above, the signal having a waveform shown in FIG. 31E in the case of short distance and large vergence angle, and the signal having a waveform shown in FIG. 31F in the case of long distance and small vergence angle. Therefore, if the amplitude and the frequency of the signal are detected at the reproducing, two stereoscopic vision informations such as the vergence angle data and the distance data can be obtained by one signal.

In addition to the recording due to the above analog modulation system, the stereoscopic vision information signals can also be recorded by a digital modulation system. That is, the stereoscopic vision information signals of any one or plural of the distance data, the vergence angle data and basic line length data, can also be recorded.

According to this embodiment, the conventional recording and reproducing section 603 having the rotating magnetic head 601 and the fixed magnetic head 602 is utilized to record and reproduce the stereoscopic image signals including stereoscopic vision information signals on the magnetic tape 604 with the same recording format as the conventional one, so that the apparatus can be produced inexpensively as compared with the apparatus shown in the thirteenth embodiment.

In case of combining the stereoscopic image recording and reproducing apparatus shown in FIG. 30 with the stereoscopic imaging apparatus, if both apparatuses are placed near, the required signals can be supplied to the stereoscopic image recording and reproducing apparatus by additionally providing only the transfer line for stereoscopic vision information signal. However, if these apparatus are placed separately, the output signals of the stereoscopic imaging apparatus must be transferred to the stereoscopic image recording and reproducing apparatus in the form of electromagnetic wave. As to such a transferring system, a transferring system utilizing present NTSC system is described, hereinafter.

Figure 32A:
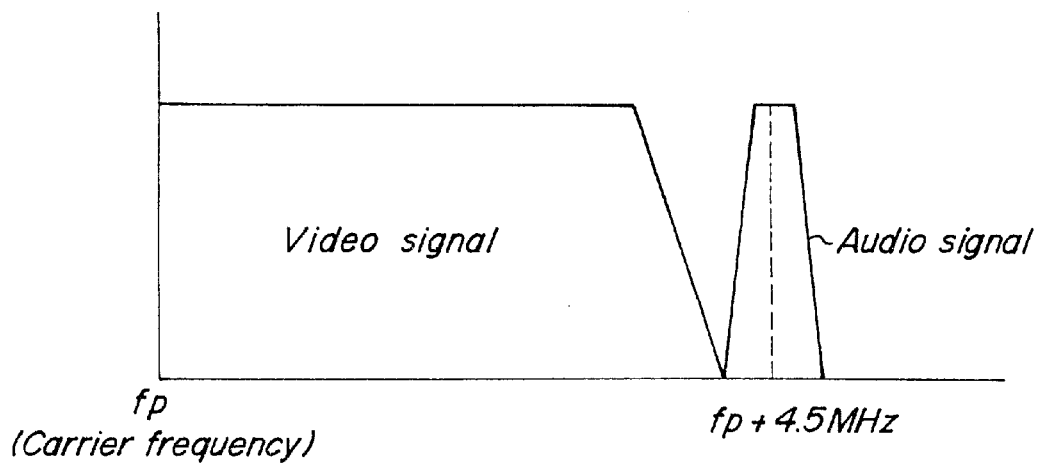
FIGS. 32A and 32B are explanatory views showing signal transferring systems of the stereoscopic image signal and the stereoscopic vision information signal.
Figure 32B:
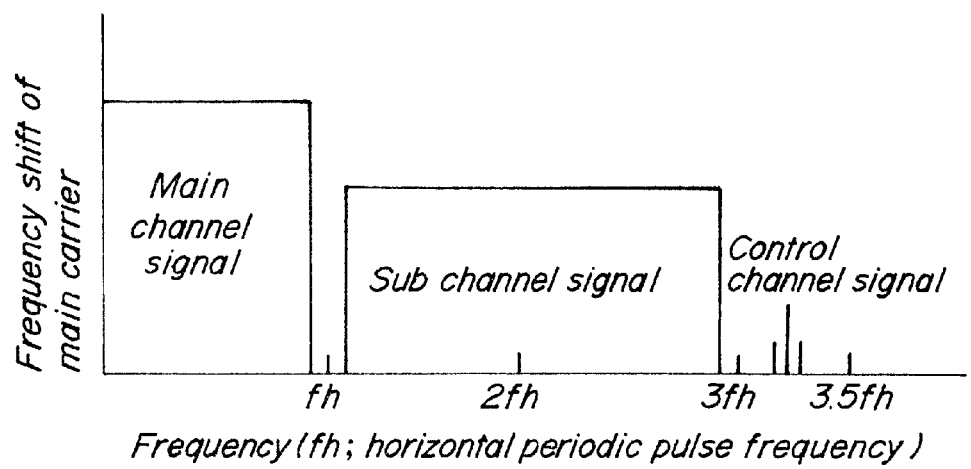

As is well known, in the television broadcasting of NTSC system, as shown in FIGS. 32A and 32B, the video signals, the main channel signal, sub-channel signal and the control channel signal of the audio signals are frequency-multiplexed and transmitted. In this case, the stereoscopic vision information signals are converted into signals similar to the audio signal, these converted signals are transmitted as a sub-channel signal of the audio signal, and the other signals are transmitted in the conventional manner. If these signals are transmitted in the above manner, the audio signals can not be heard in stereoscopically, but the signals including the stereoscopic vision information signals can be transmitted as in the conventional system.

Figure 33:
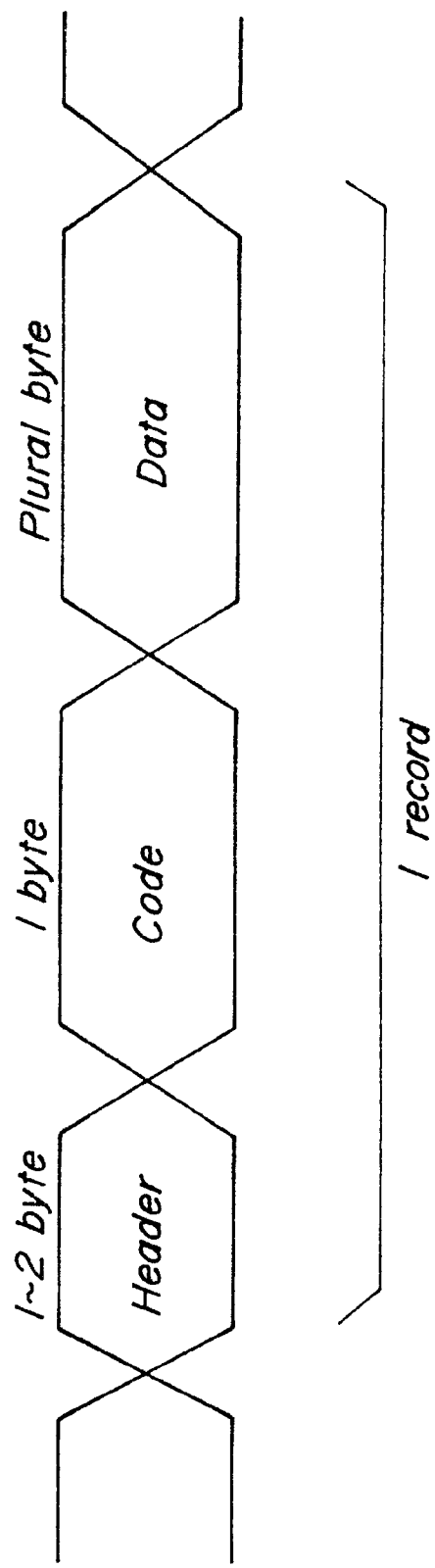
FIG. 33 is an explanatory view showing fifteenth embodiment of a recording format of the stereoscopic vision information signal in the stereoscopic image recording and reproducing apparatus according to the present invention.
Figure 34:
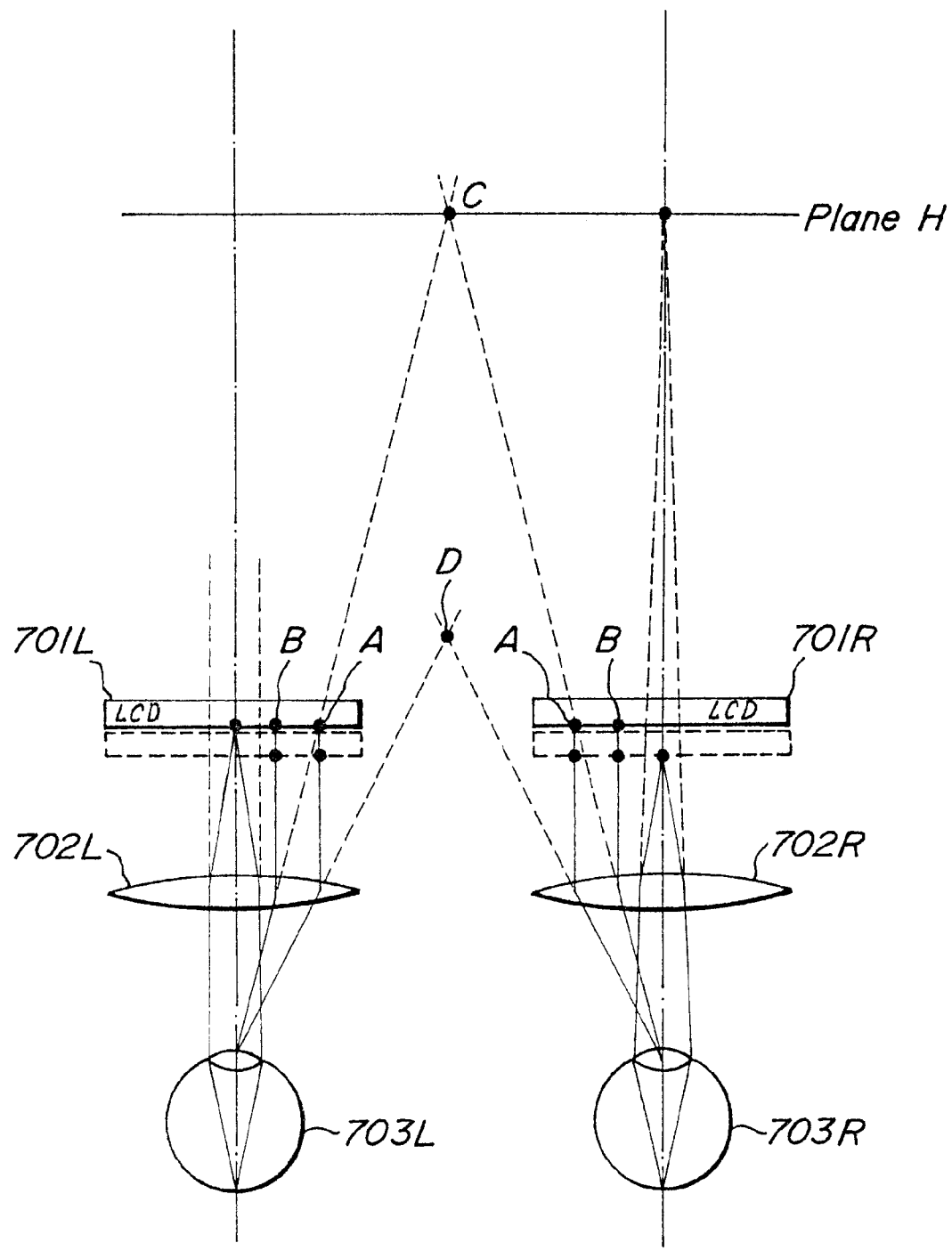
FIG. 34 is an explanatory view showing a construction of a conventional stereoscopic image displaying apparatus.

As shown in FIG. 33, according to a fifteenth embodiment of the present invention, in the image recording and reproducing apparatus capable of performing a high fidelity recording and a PCM recording such as 8 mm video deck, the audio signals are recorded on the high fidelity recording portion of the magnetic tape, and the stereoscopic vision information signals are recorded on the PCM recording portion of the magnetic tape. Therefore, in this embodiment, the recording format of the digitalized signal is formed in such a manner that as shown in FIG. 33, the record is constructed by three kinds of header, code and data, so that the start of the record is detected in the header portion, the kinds of stereoscopic vision information signals are recognized in the record portion and the numerical data are held in the data portion.

If the signals are recorded as in the above, the stereoscopic vision information signals are made high speed and continuous, so that few kinds of stereoscopic vision information signals can be recorded and utilized. Moreover, the data length may be expanded up to few bytes, so that the reproduction of delicate motion can be performed. In this way, this embodiment utilizes the PCM recording portion, so that the utility efficiency of the stereoscopic vision information signals can be increased.

The embodiments shown in FIGS. 28, 30 and 33 are explained as a stereoscopic image recording and reproducing apparatus, this stereoscopic image recording and reproducing apparatus can be separated as a stereoscopic image recording apparatus and a stereoscopic image reproducing apparatus.

As described above, according to the stereoscopic imaging apparatus of the present invention, the imaging condition can be set simply at the imaging time of the stereoscopic image, and the stereoscopic imaging apparatus can be downsized. Moreover, as right and left image data, the image including equal information amount in the right and left directions around the aimed subject can be exhibited, so that the distance information of the aimed object can be ensured.

According to the stereoscopic image displaying apparatus of the present invention, the setting can be simplified at the displaying time of the stereoscopic image, and the stereoscopic image displaying apparatus can be downsized. Also, as right and left image data, in addition to the parallax information, vergence condition and the diopter condition in accordance with the exhibition distance of the aimed exhibiting matter can be reproduced.

According to the stereoscopic image recording and reproducing apparatus of the present invention, the condition setting can be simplified at the time of the stereoscopic image recording and reproducing, and the the stereoscopic image recording and reproducing apparatus can be downsized. Moreover, the right and left image data and the distance information of the aimed exhibiting matter can be recorded and reproduced under the synchronized condition.

What is claimed is:

1. A stereoscopic image display apparatus comprising:
   a first image display means for displaying images to be led to a right eye of viewer;
   a second image display means for displaying images to be led to a left eye of the viewer;
   a first ocular optical system for leading luminous flux onto the right eye so as to be able to observe the images displayed on the first image display means as a virtual image;
   a second ocular optical system for leading luminous flux onto the left eye so as to be able to observe the images displayed on the second image display means as a virtual image;
   a receiving device for receiving information signals including image signals displayed on at least one of the first image display means and the second image display means;
   a binocular vision information output means for outputting information corresponding to the vergence angle caused between the image displayed on the first image display means and the image displayed on the second image display means from the received information signals of the receiving device; and
   diopter adjusting means for adjusting a position of at least one pair of the first image display means and the second image display means, and the first ocular optical system and the second ocular optical system, so as to correspond a diopter for stereoscopic observation with a distance decided by information corresponding to the vergence angle output by the binocular vision information output means.

2. A stereoscopic image display apparatus as claimed in claim 1, wherein the first and second image display means, the first and second ocular optical systems and the diopter adjusting means are arranged in a head-mounted image display apparatus mounted on the head of the viewer, and the receiving device and the binocular vision information output means are arranged in an image processing device separated to the head-mounted image display apparatus.

3. A stereoscopic image display apparatus as claimed in claim 1, wherein the binocular vision information output means has an imaging distance reading means for reading imaging distance signals up to a subject and previously included in the information signals, and for outputting the imaging distance signals as output information corresponding to the vergence angle.

4. A stereoscopic image display apparatus as claimed in claim 1, wherein the binocular vision information output means has a computer graphics distance reading means for reading distance signals up to an object on a computer graphics and previously included in the information signals and for outputting the computer graphics distance signals as output information corresponding to the vergence angle.

5. A stereoscopic image display apparatus as claimed in claim 1, wherein the binocular vision information output means has an operation processing device for performing a correlation process of a first image signal and a second image signal which are included in the information signals, thereby calculating the diopter of the subject to be observed.

6. A stereoscopic image display apparatus as claimed in claim 1, wherein the receiving device has a television signal receiving unit for receiving television signals.

7. A stereoscopic image display apparatus as claimed in claim 1, wherein the receiving device has a reproduced image signal receiving unit for receiving on imaging signal reproduced from a recording medium by a reproducing device.

8. A stereoscopic image display apparatus as claimed in claim 1, wherein the receiving device has a computer graphics image signal receiving unit for receiving image signals for the computer graphics.

9. An apparatus as claimed in claim 1, wherein said diopter adjusting means adjusts said position so as to coincide said diopter with said distance.

* * * * *